US005659887A

United States Patent [19]
Ooe

[11] Patent Number: 5,659,887
[45] Date of Patent: Aug. 19, 1997

[54] PORTABLE RADIOTELEPHONE AND HOLDER FOR MOUNTING WITHIN A VEHICLE

[75] Inventor: Yoshifumi Ooe, Shioya-gun, Japan

[73] Assignee: Kabushiki Kaisha Honda Access, Asaka, Japan

[21] Appl. No.: 231,978

[22] Filed: Apr. 21, 1994

Related U.S. Application Data

[63] Continuation of Ser. No. 898,946, Jun. 15, 1992, abandoned.

[30] Foreign Application Priority Data

| Jun. 15, 1991 | [JP] | Japan | 3-053721 U |
|---|---|---|---|
| Jun. 15, 1991 | [JP] | Japan | 3-053722 U |
| Jun. 15, 1991 | [JP] | Japan | 3-053723 U |
| Jun. 15, 1991 | [JP] | Japan | 3-170671 |
| Sep. 25, 1991 | [JP] | Japan | 3-085831 U |

[51] Int. Cl.[6] .................................................. H04B 1/16
[52] U.S. Cl. ........................... 455/575; 455/90; 379/420
[58] Field of Search ............................ 455/74, 89, 90, 455/95, 99, 100, 345–351; 379/419, 420, 440, 447, 449, 454, 455

[56] References Cited

U.S. PATENT DOCUMENTS

| 2,579,878 | 12/1951 | Stone | 379/455 |
|---|---|---|---|
| 4,191,861 | 3/1980 | Walker, Jr. | 379/447 |
| 4,647,722 | 3/1987 | Nishida et al. | 455/89 |
| 4,741,034 | 4/1988 | Errichiello et al. | 379/455 |
| 4,771,927 | 9/1988 | Ventura | 379/446 |
| 4,782,526 | 11/1988 | Uchino et al. | 379/419 |
| 4,842,174 | 6/1989 | Sheppard et al. | 379/454 |
| 5,033,709 | 7/1991 | Yuen | 379/454 |
| 5,131,036 | 7/1992 | Dunchock | 379/446 |
| 5,212,722 | 5/1993 | Murata | 379/420 |
| 5,349,698 | 9/1994 | Maru | 455/89 |
| 5,452,474 | 9/1995 | Kagawa | 455/66 |

FOREIGN PATENT DOCUMENTS

| 0394744 | 10/1990 | European Pat. Off. | 455/90 |
|---|---|---|---|
| 2415395 | 9/1979 | France | 379/420 |
| 2806547 | 8/1979 | Germany | 455/89 |
| 0030241 | 2/1983 | Japan | 455/89 |
| 0275248 | 11/1988 | Japan | 379/419 |
| 1-128647 | 5/1989 | Japan . | |
| 221759 | 1/1990 | Japan . | |
| 2-128449 | 10/1990 | Japan . | |
| 324443 | 3/1991 | Japan . | |
| 0065847 | 3/1991 | Japan | 379/455 |
| 3-123130 | 5/1991 | Japan . | |
| 0160852 | 7/1991 | Japan | 379/449 |
| 2210233 | 6/1989 | United Kingdom | 379/420 |
| 2243049 | 10/1991 | United Kingdom | 379/446 |

*Primary Examiner*—Edward F. Urban
*Attorney, Agent, or Firm*—Birch Stewart Kolasch & Birch, LLP

[57] ABSTRACT

In an audio message communication apparatus for an automobile, a portable radiotelephone is supported on a holder which is mounted forwardly of a driving compartment. An external amplifier and an external microphone are connected through the holder to an earphone microphone terminal of the radiotelephone. The external amplifier is connected to an external speaker for amplifying a received audio signal of the radiotelephone which is converted into a voice so as to be generated in a form of a loud voice. A transmitting voice is entered through the external microphone into the radiotelephone. With the above construction, the audio message communication is effectively achieved with an operator's hands free.

17 Claims, 25 Drawing Sheets

1

PORTABLE RADIOTELEPHONE AND HOLDER FOR MOUNTING WITHIN A VEHICLE

This application is a continuation of application Ser. No. 07/898,946, filed on Jun. 15, 1992, now abandoned.

BACKGROUND OF THE INVENTION

1. Field of the Invention

The present invention relates to a message communication apparatus for an automobile which communicates an audio message with an operator's hands free by utilizing a portable radiotelephone within a compartment of the automobile.

2. Description of Background Art

There is known a radiotelephone for an automobile which is a telephone to be used within a compartment of the automobile, wherein a hand set is arranged in the vicinity of an operator's seat, and a radio device connected by a wire to the hand set is arranged in a trunk or the like. Recently a portable radiotelephone has become popular within a hand set and a radio device are integrally combined and which is formed as compact as possible so as to be carried in an individual's hand.

Such kinds of radiotelephones for the automobile as mentioned above, however, are comparatively large in size and hence occupy a large space. Accordingly, it is preferrable to utilize a small-sized and easily operable radiotelephone of a portable type. On the other hand, since an operator is engaged in a driving operation of a steering wheel or the like during travelling of the automobile, it is desirable for the operator to communicate a message with his hands free. When utilizing the portable radiotelephone with the operator's hands free, however, it will be required to connect a separate microphone of an earphone through a long cord to a microphone terminal thereof, whereby incurring disadvantages of mounting the microphone of the earphone and of extending the cord at each time when communicating an audio message with the operator's hands free.

SUMMARY OF THE INVENTION

Therefore, the present invention is made in view of the afore-mentioned disadvantages and an object of the present invention is to provide an improved message communication apparatus in use for an automobile which enables an operator to communicate an audio message without any difficulty.

To this end, according to the present invention, there is provided a message communication apparatus for an automobile to be utilized with an operator's hands free comprising a holder mounted forwardly of an operator's seat within a driving compartment of an automobile, a portable radiotelephone adapted to be carried on a support means of the holder, an external amplifier being provided in the holder and connected to an audio output terminal of the radiotelephone so as to amplify a received audio signal from the audio output terminal, an external loudspeaker being connected to the external amplifier to convert the amplified received audio signal of the amplifier into a voice so as to generate a loud voice, and an external microphone adapted to be connected through the holder to a audio input terminal of the portable radiotelephone so as to enter a transmitting voice into the radiotelephone. With the above construction, the message communication apparatus of the present invention requires no separate earphone microphone as referred to with respect to the prior art device so that the operator may easily communicate the message with his hands free.

The above and other related objects and features of the present invention will be apparent from the following description of the disclosure when the same is read in connection with the accompanying drawings.

DETAILED DESCRIPTION OF THE PREFERRED EMBODIMENT

Figure 1:
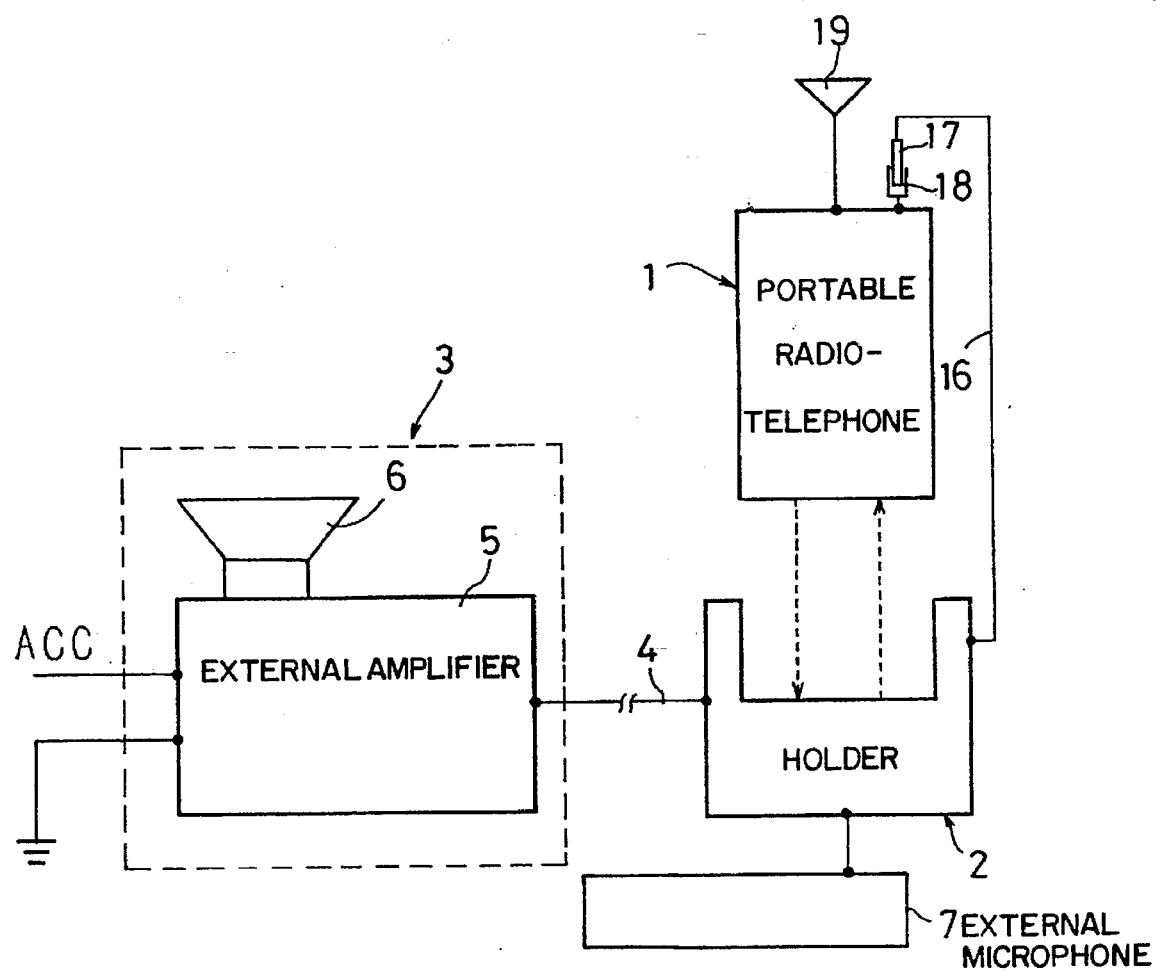
FIG. 1 is a block diagram of the first embodiment pursuant to the present invention.

Referring now to the drawings, wherein like reference numerals designate like or corresponding parts throughout, FIG. 1 shows an example of an audio message communication system pursuant to the present invention in which reference numeral 1 designates a portable radiotelephone carried by a holder 2. A hand free unit 3 is connected through a cord 4 to the holder 2. An external amplifier 5 and an external loudspeaker 6 are installed in the hand free unit 3. The external amplifier 5 is connected to an accessory electric power source thereby enabling the portable radiotelephone 1 to be charged with electricity. The external amplifier 5 is provided with an automatic power-off circuit for automatically switching an electric power off at a predetermined time interval after the communication and an automatic power-on circuit for automatically switching an electric power on when the portable radiotelephone 1 is called at its off state. There is installed in the holder 2 an external microphone 7 which is not used in such a state as carried in a hand and is capable of amplifying an input voice by connecting an amplifier thereto. Throughout the embodiments, a word "external" means "separately provided from the portable radiotelephone 1".

Figure 2:
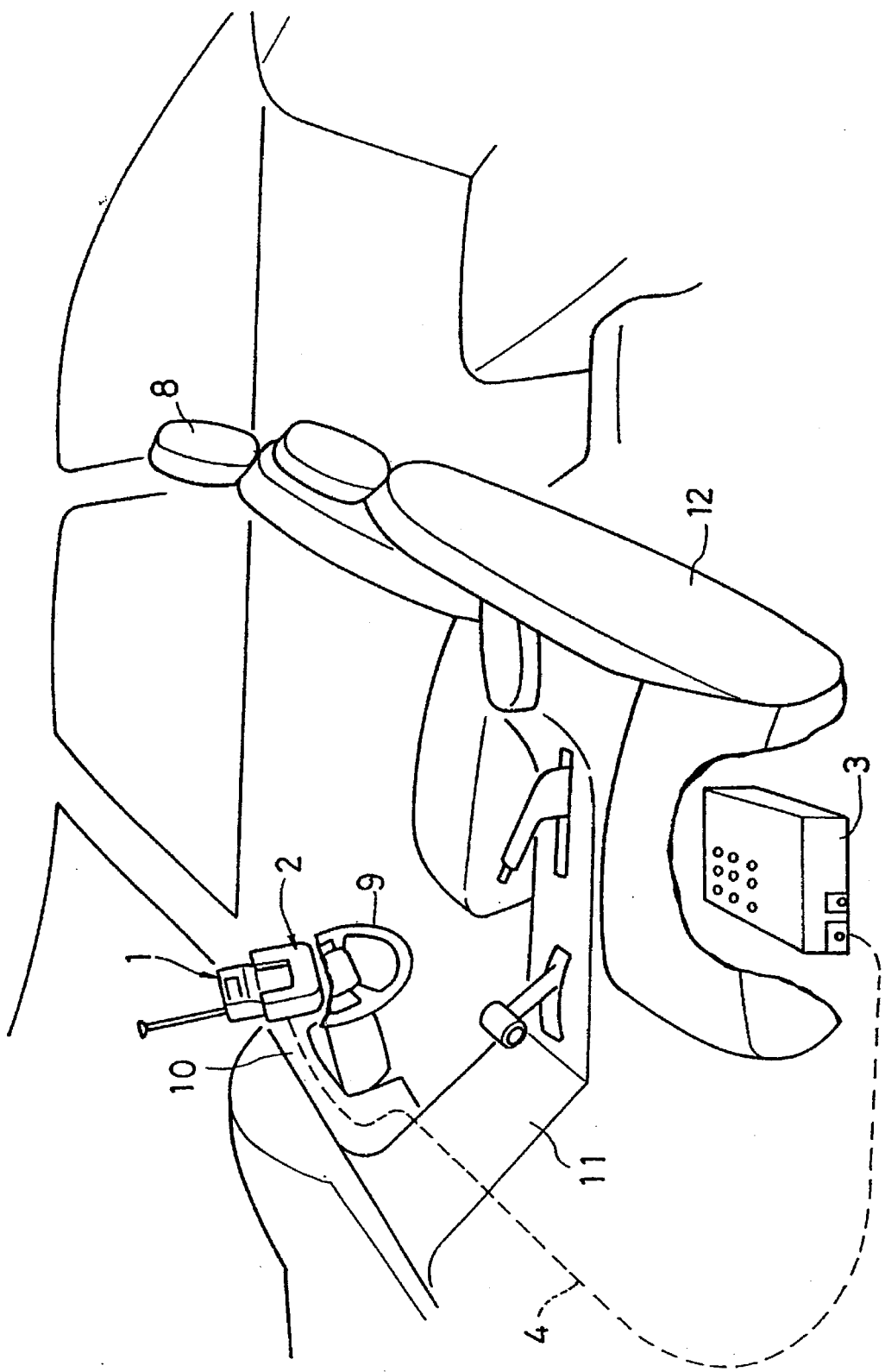
FIG. 2 is a schematic illustration showing an arrangement within a automobile compartment.
Figure 3:
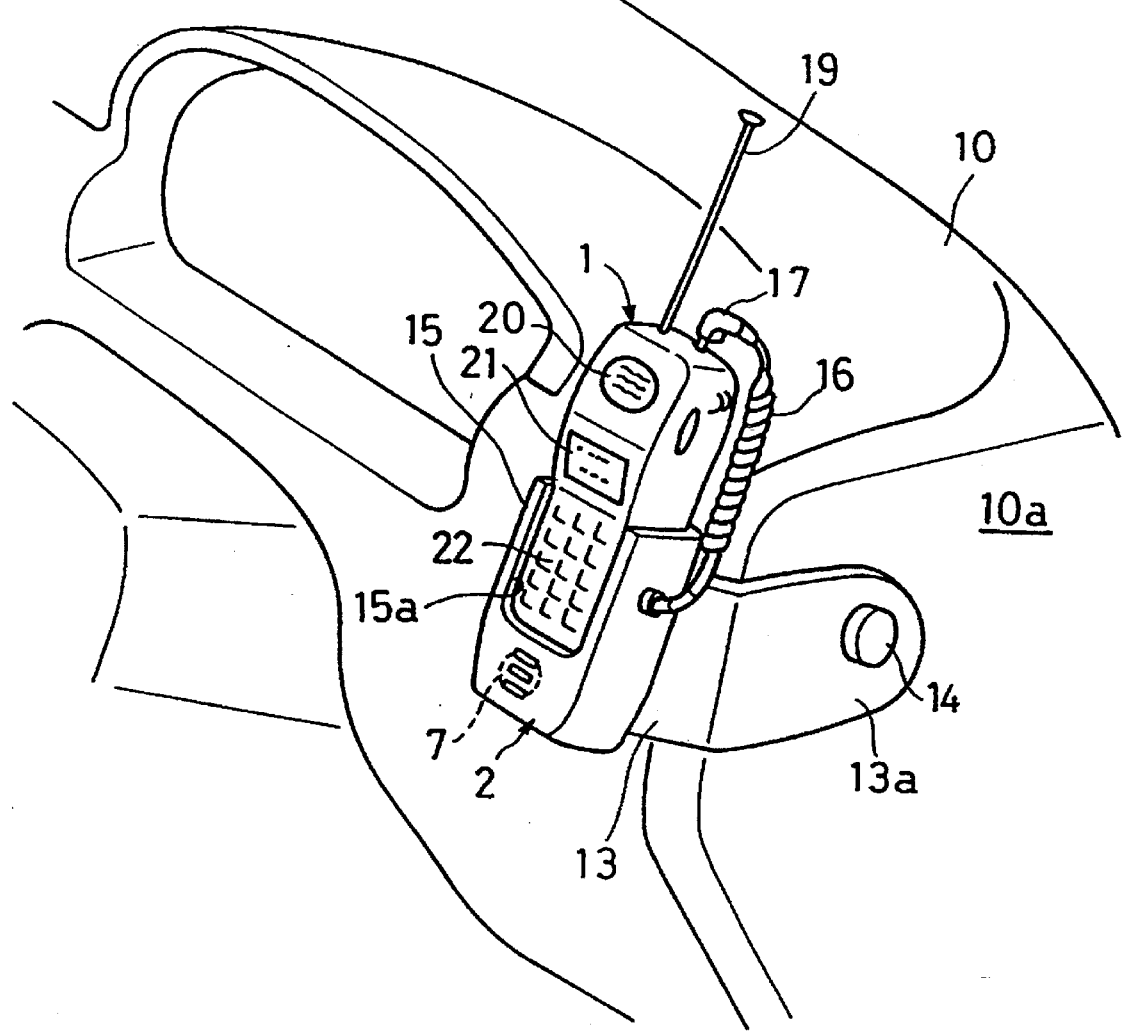
FIG. 3 is a perspective view showing an essential part of the invention.
Figure 4:
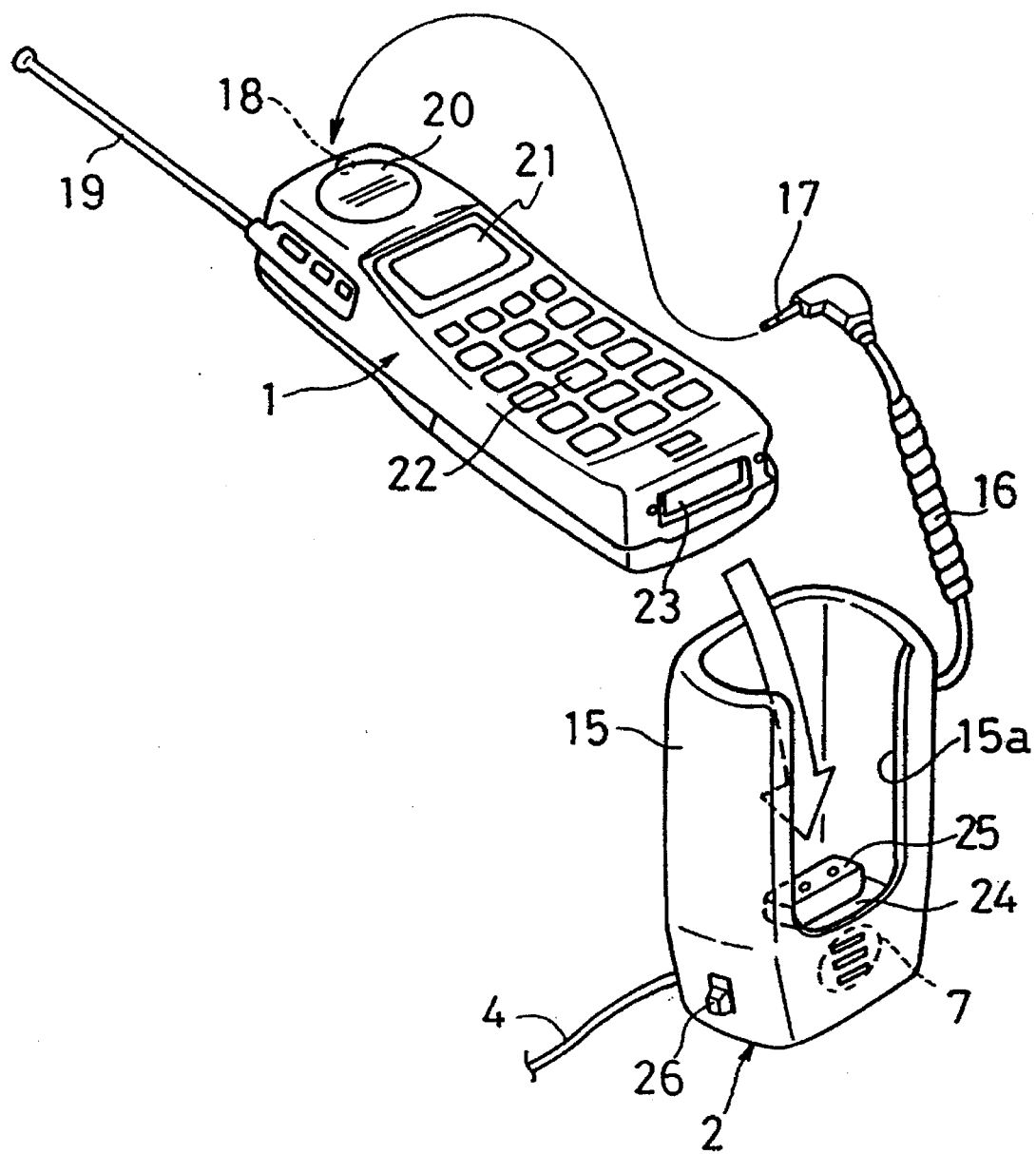
FIG. 4 is an exploded perspective view for explaining a construction of an essential part.

FIG. 2 illustrates an inside compartment of the automobile, in which the holder 2 is mounted on an instrument panel 10 forwardly of an operator's seat 8 at the lateral side of a steering wheel 9. The cord 4 extends from the holder 2 through insides of the instrument panel 10 and a console box 11 respectively towards a passenger seat 12 so as to be connected to the hand free unit 3 disposed on a floor under the seat 12. In FIG. 3, the portable radiotelephone 1 is illustrated in such a position as carried by the holder 2 and in FIG. 4 in such a position as taken out of the holder 2. As shown in FIG. 3, the holder 2 is mounted on an L-shaped bracket 13 which is fixedly secured through a bolt 14 to a side wall 10a of the instrument panel 10. As shown in FIG. 4, the holder 2 is formed in the shape of a substantially rectangular box with an upwardly opened space which permits the portable radiotelephone 1 to be accommodated therethrough. A peripheral side wall 15 functions as a support means for the radiotelephone 1. At the front side of the side wall 15 there is provided a U-shaped cutout 15a under which the external microphone 7 is arranged. The cord 4 extending to the hand free unit 3 is connected to the external microphone 7 and to a flexible cord 16. At the top end of the flexible cord 16 is provided a jack 17. The portable radiotelephone 1 is provided with an earphone microphone terminal 18, to be connected with the jack 17, and an antenna 19. The earphone microphone terminal 18 is utilized and functions as each of an audio output terminal and an audio input terminal according to the present invention and, when the jack 17 is connected thereto, is adapted to connect the audio output terminal and the audio input terminal to the external amplifier 5 and the external microphone 7, respectively. On the front surface of the portable radiotelephone are provided a speaker 20, an indicator 21 and an operation button 22. The operation button 22 is located inside the cutout 15a to be operably exposed thereat. At the bottom of the portable radiotelephone 1, there is provided an electric charge socket 23 to be engaged with a charge terminal 25 located on a bottom 24 of the holder 2. The charge terminal 25 is connected through an electrical switch 26 and the cord 4 to the hand free unit 3 so that upon turning the switch 26 on an electric power is applied to the charge terminal 25.

In operation, as shown in FIG. 2, when the hand free unit 3 is connected to the holder 2 and, as shown in FIG. 4, the portable radiotelephone 1 is inserted at the bottom thereof into the holder 2, the radiotelephone 1 is supported on the instrument panel 10 by the holder 2 and the charge socket 23 comes into engagement with the charge terminal 25. Next, upon connecting the jack 17 of the cord 16 to the earphone microphone terminal 18, the portable radiotelephone 1 is connected to the holder 2 and the hand free unit 3. Thus, the audio output of the radiotelephone 1 is connected through the holder 2 and the cord 4 to the hand free unit 3, while the audio input of the radiotelephone 1 is connected to the external microphone 7. In this condition, the radiotelephone 1 is located in a face-to-face relation with the operator thereby allowing the operator to communicate an audio message with his hands free. At the time of communication, the received audio signal of the portable radiotelephone 1 is applied through the earphone microphone terminal 18, the jack 17, the cord 16 and the cord 4 to the external amplifier 5 of the hand free unit 3 so as to be amplified thereby. The received audio signal amplified by the external amplifier 5 is converted into a voice and generated from the external loudspeaker in the form of such a loud voice as possible to be heard by the operator. The speaking voice of the operator directed to the holder 2 is transmitted from the external microphone 7 through the cord 16, the jack 17 and the earphone microphone terminal 18 to the audio input side of the portable radiotelephone 1 so that the transmitting voice after a predetermined processing by the radiotelephone may be sent from the antenna 19 by radio. Further, when turning the power switch 26 on, the electric power is supplied to the charge socket 23 thereby to charge the radiotelephone 1 through the accessory power source. Also it will be understood that the radiotelephone 1 may be utilized as a conventional portable radiotelephone when taken out of the holder 2.

Figure 5:
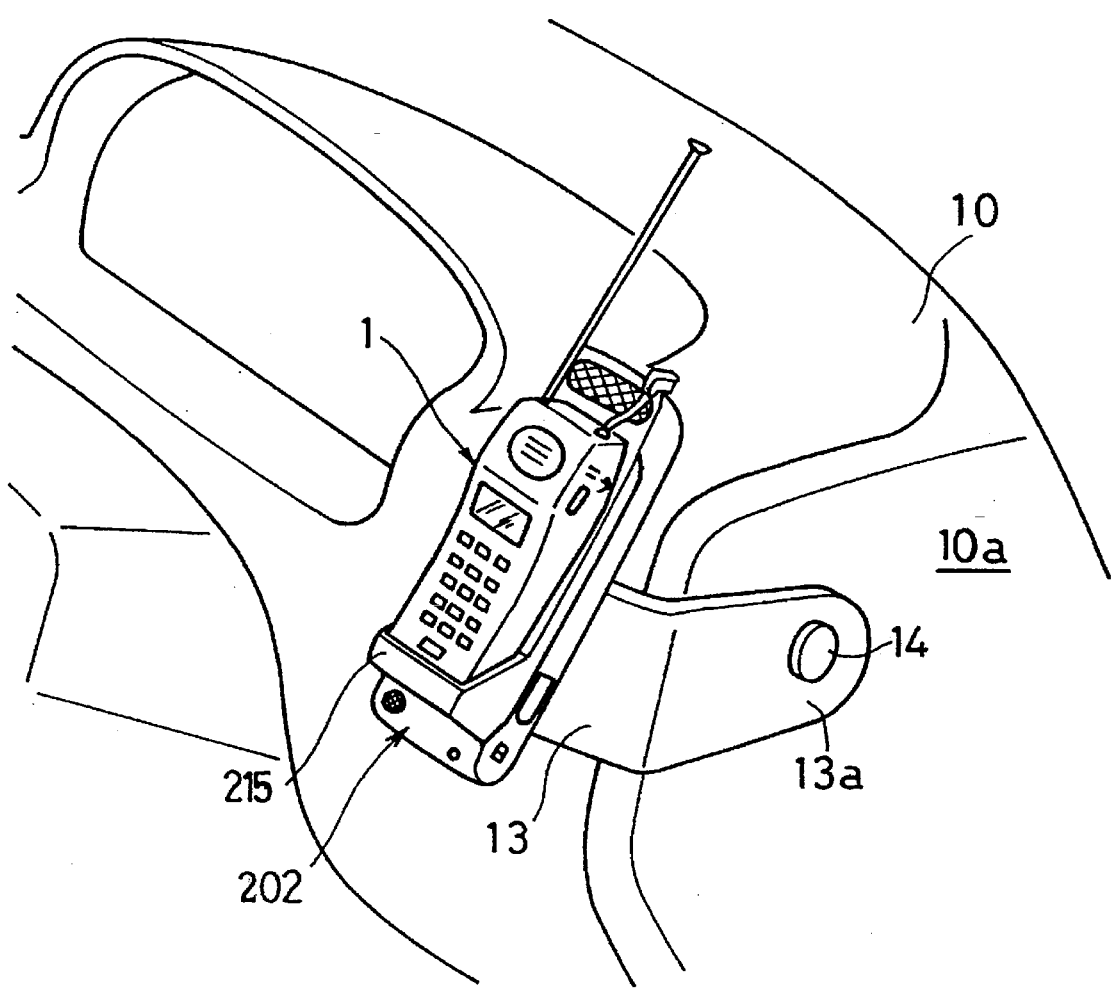
FIG. 5 is a perspective view showing an essential part of the second embodiment.
Figure 6:
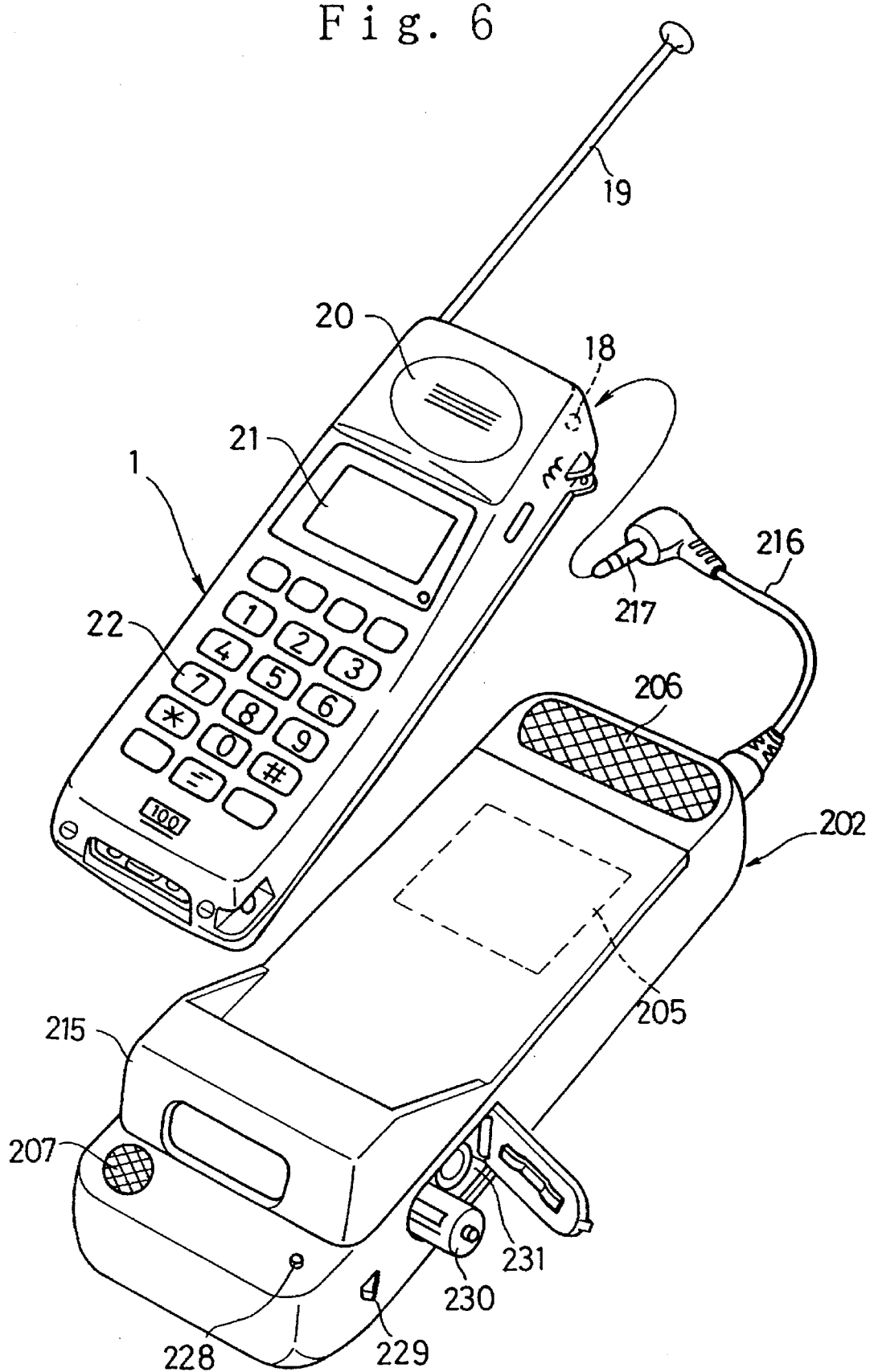
FIG. 6 is an exploded perspective view for explaining a construction of an essential part.
Figure 7:
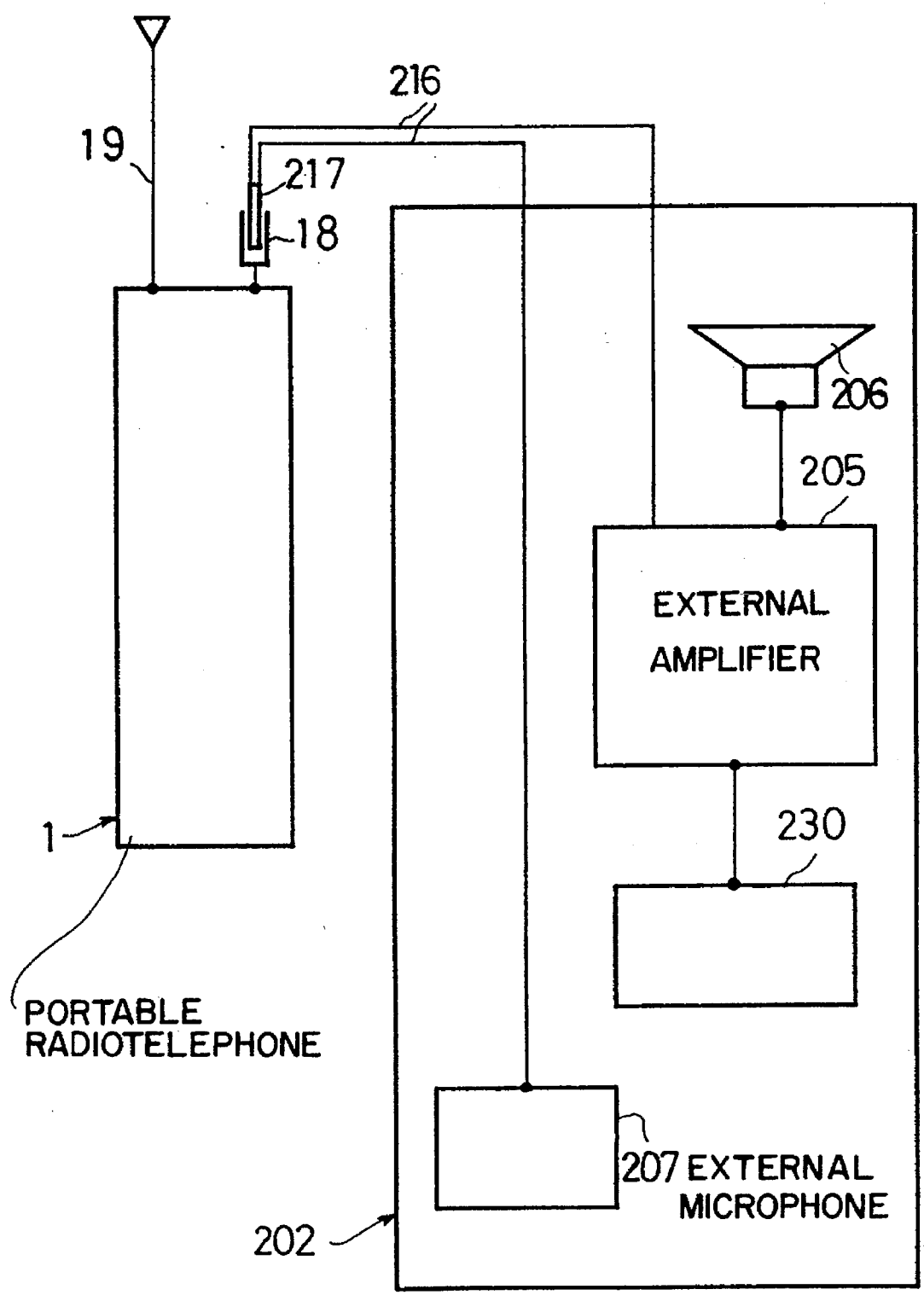
FIG. 7 is a block diagram of the second embodiment.

FIGS. 5 through 7 show the second embodiment of the present invention, wherein a holder and a hand free unit are formed integral with each other, different from the first embodiment, but a portable radiotelephone is formed similar to that of the first embodiment. A holder 202 is provided integral with a hand free unit and an external amplifier 205 and an external loudspeaker 206 are installed in the holder 202. On the lower part of the holder 202 there is provided a support box 215 for partially accommodating and carrying thereon the portable radiotelephone 1. Under the support box 215 are provided an external microphone 207 and a power indicator 228 of light emitting diode. On the lateral side of the holder 202 there is formed a housing 231 for accommodating therein a main switch 229 and a battery 230. The external amplifier 205 is energized by the battery 230 and has an automatic power-off circuit which functions at a predetermined time interval after a communication signal is cut. The external loudspeaker 206 is positioned above the portable radiotelephone 1 when the latter is mounted on the holder 202. At the top of the holder 202 there is provided a cord 216 which has at the tip end thereof a jack 217 to be connected to an earphone microphone terminal 18 of the radiotelephone 1. The holder 202 is mounted on an instrument panel 10 in the same manner as the first embodiment. In this embodiment, since the external amplifier 205 and the external loudspeaker 206 are installed in the holder 202 in addition to the external microphone 207, it is not required to provide a separate hand free unit 3 like the first embodiment thereby to diminish an arrangement of a cord.

Figure 8:
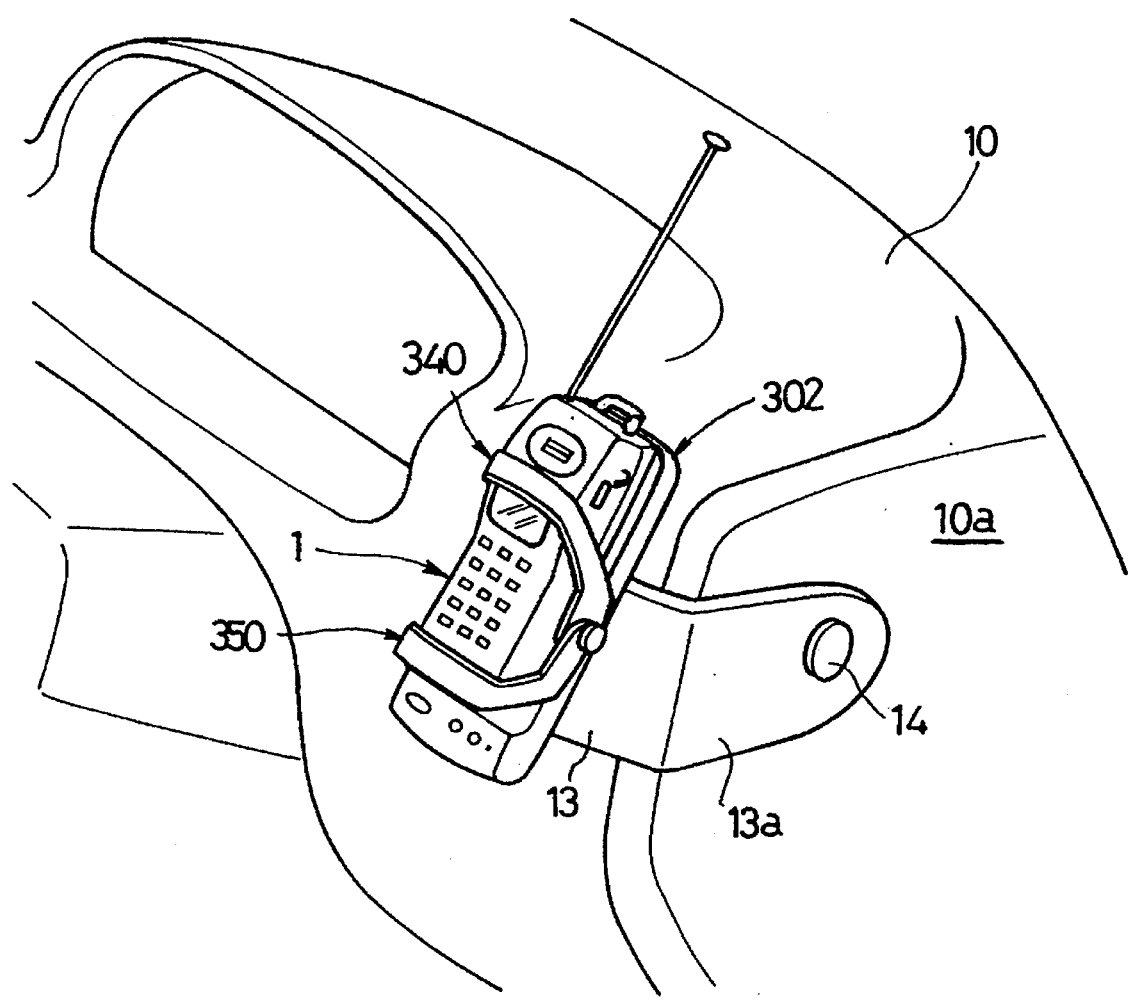
FIG. 8 is a perspective view showing an essential part of the third embodiment.
Figure 9:
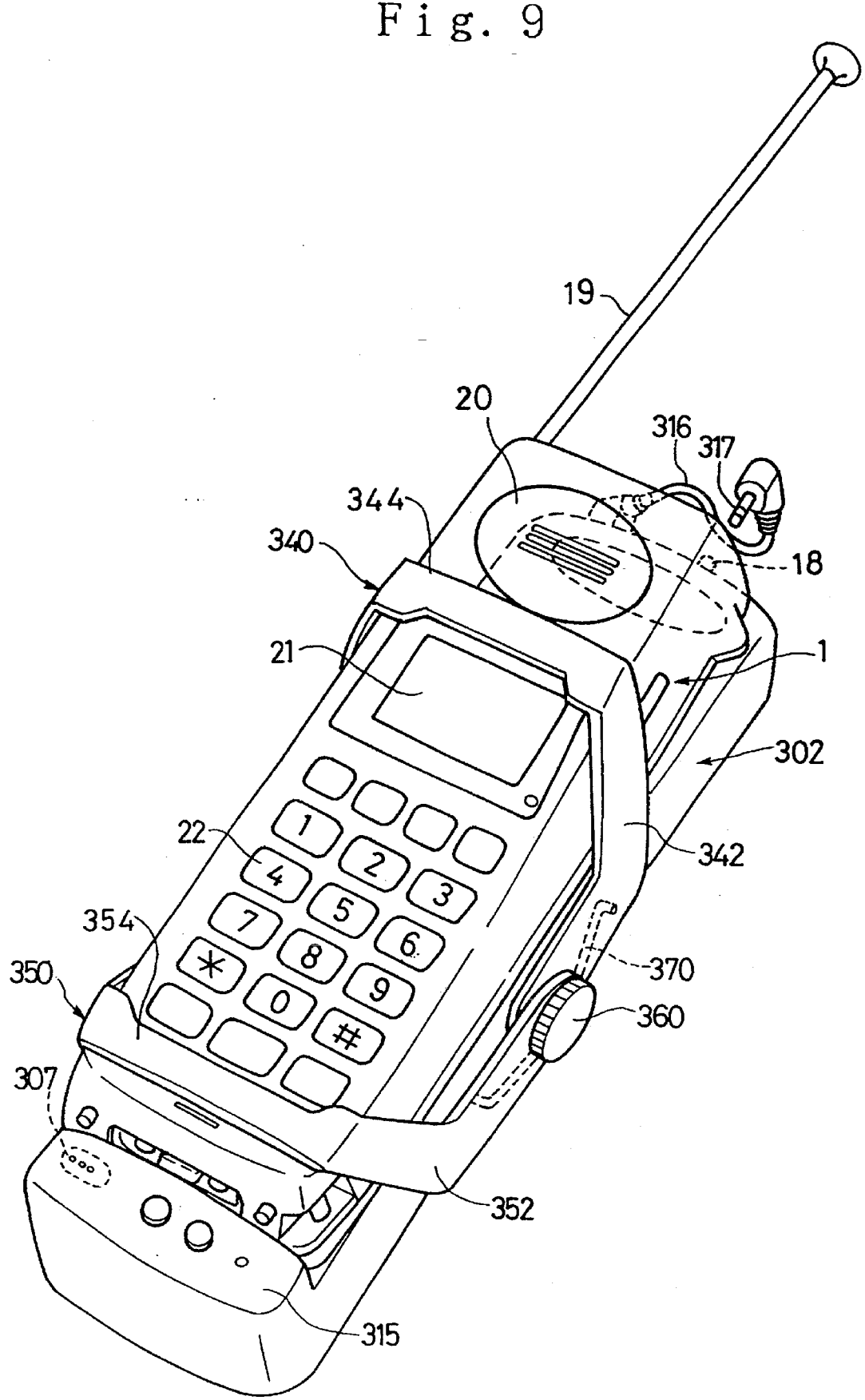
FIG. 9 is a perspective view showing a combined state between a holder and a portable radiotelephone.
Figure 10:
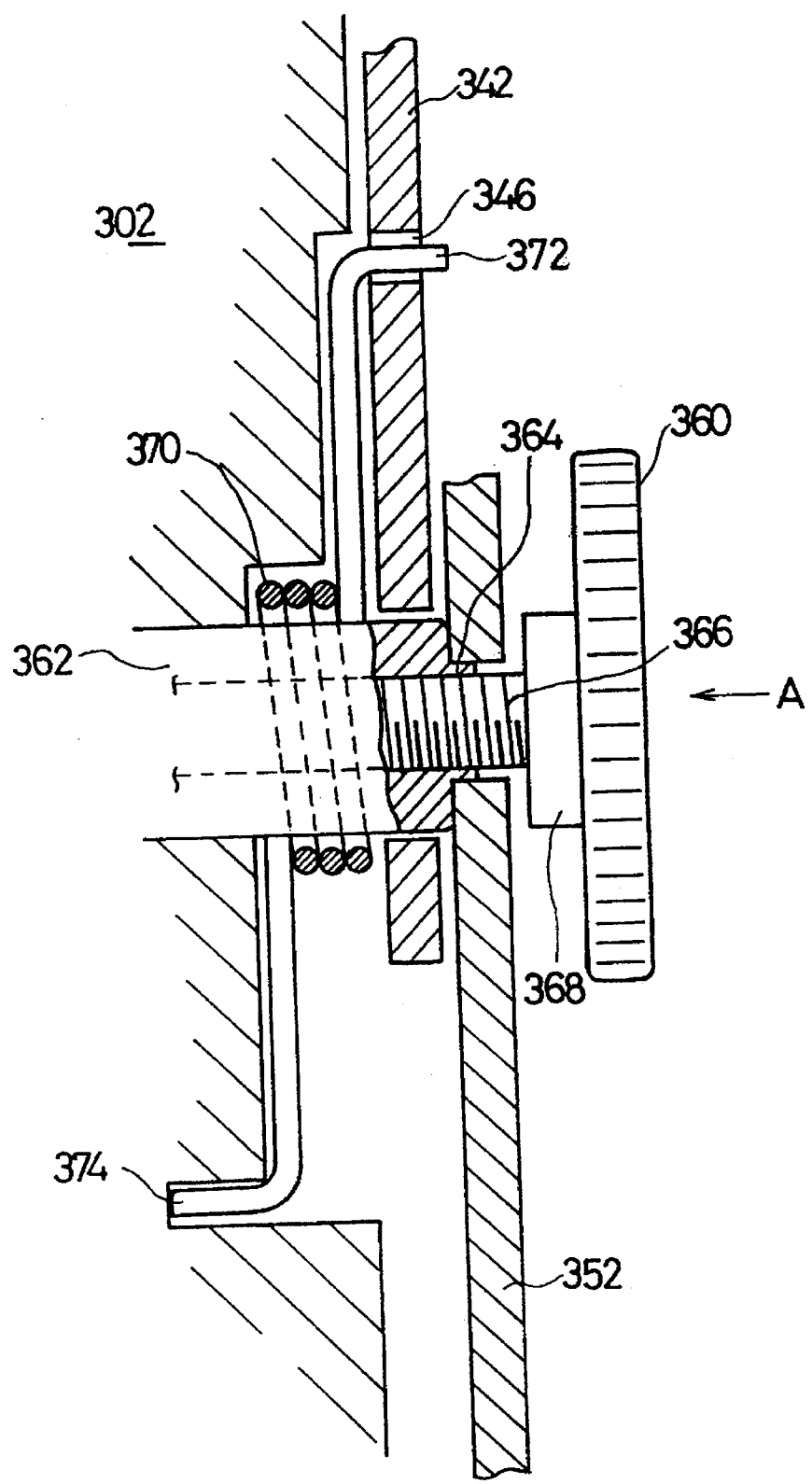
FIG. 10 is an enlarged cross section of an essential part.
Figure 11:
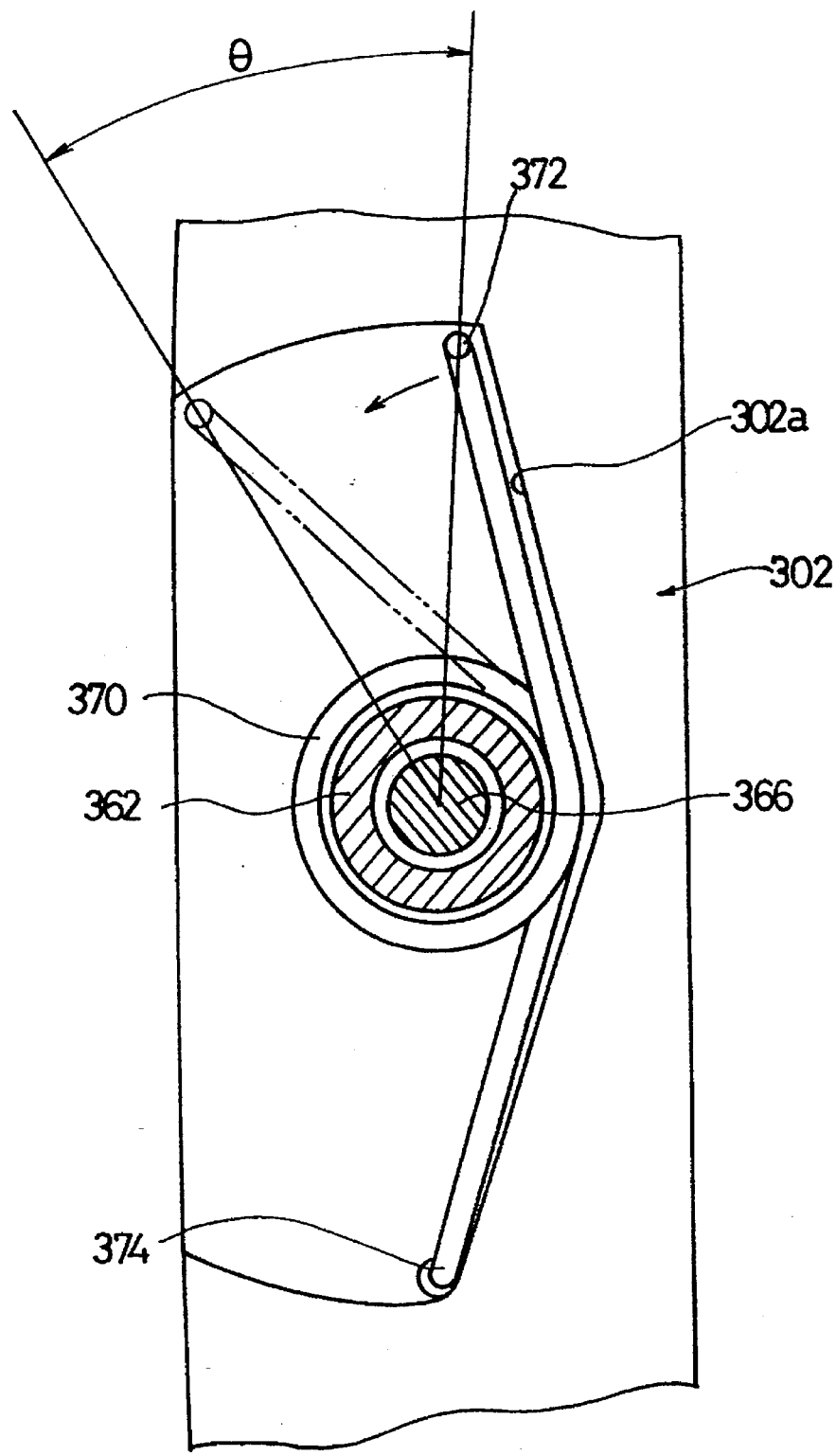
FIG. 11 is an operation explanatory view as viewed in a direction of an arrow A.

FIGS. 8 through 12 show the third embodiment wherein FIG. 8 illustrates the mounting condition of the apparatus within the driving compartment of the automobile and FIG. 8 illustrates the carried condition of a portable radiotelephone 1 on a holder 302. The radiotelephone 1 is fixedly supported on the holder 302 by a first and second fixing members 340 and 350. The holder 302 is mounted through an L-shaped bracket 13 on an instrument panel 10 by a bolt 14 and positioned to be in a face-to-face relationship to an operator. In FIG. 9, the holder 302 is provided with a hand free unit in the same way as the second embodiment and at the top thereof with a cord 316 which has at the tip thereof a jack 317 to be connected to an earphone microphone terminal 18. A stepped support 315 is formed on the lower end of the holder 302 to carry the portable radiotelephone 1 thereon and has arranged therein an external microphone 307. The first and second fixing members 340 and 350 are formed of hard metal into a U-shape and pivoted on a common axis at substantially center positions of each of the lateral sides of the holder 302. First and second arms 342 and 352 extend obliquely at each lateral side of the radiotelephone 1 in opposite directions, respectively. The first arm 342 is pivotally biased by a coiled spring 370 so that a pusher portion 344 is forced towards the holder 302 to firmly hold the portable radiotelephone 1 between the arm 342 and the holder 302. Then, the pusher portion 344 is positioned between a loudspeaker 20 and an indication panel 21 so as not to overlap with the latter. The pivotal angle of the second arm 352 is adjustable at a predetermined extent and a holding portion 354 is capable of supporting the lower portion of the portable radiotelephone 1 in such a position as not to overlap with the operation buttons 22. As shown in FIG. 10, the coiled spring 370 is arranged around a pivot shaft 362 which is protruded out of the lateral side of the holder 302, and engaged at its one end 372 with a through-hole 346 and at its other end 374 with a groove of the holder 302. In FIG. 11, the coiled spring 370 is pre-loaded so as to pivot the first arm 342 in the counterclockwise direction and the pivotal movement of the arm 342 is limited by abutting the end 372 of the coiled spring 370 to a stopper 302a which comprises a step formed on the lateral wall of the holder 302. The pivot shaft 362 has an end 364 of smaller diameter on which the second arm 352 is pivotally supported. A screw 360 is rotatably engaged at a threaded shaft portion 366 thereof with a threaded hole of the pivot shaft 362 and, when screwed up into the pivot shaft 362, adapted to press the second arm 352 through a boss 368 thereof thereby stopping the pivotal movement of the second arm 352. When loosening the screw 360, the second arm 352 may be pivoted around the smaller diameter end of the pivot shaft 362 whereby the pivot angle of the second arm 352 is adjusted. By fastening the screw 360, a space between the holding portion 354 and the holder 302 is maintained at the adjustably fixed level.

Figure 12:
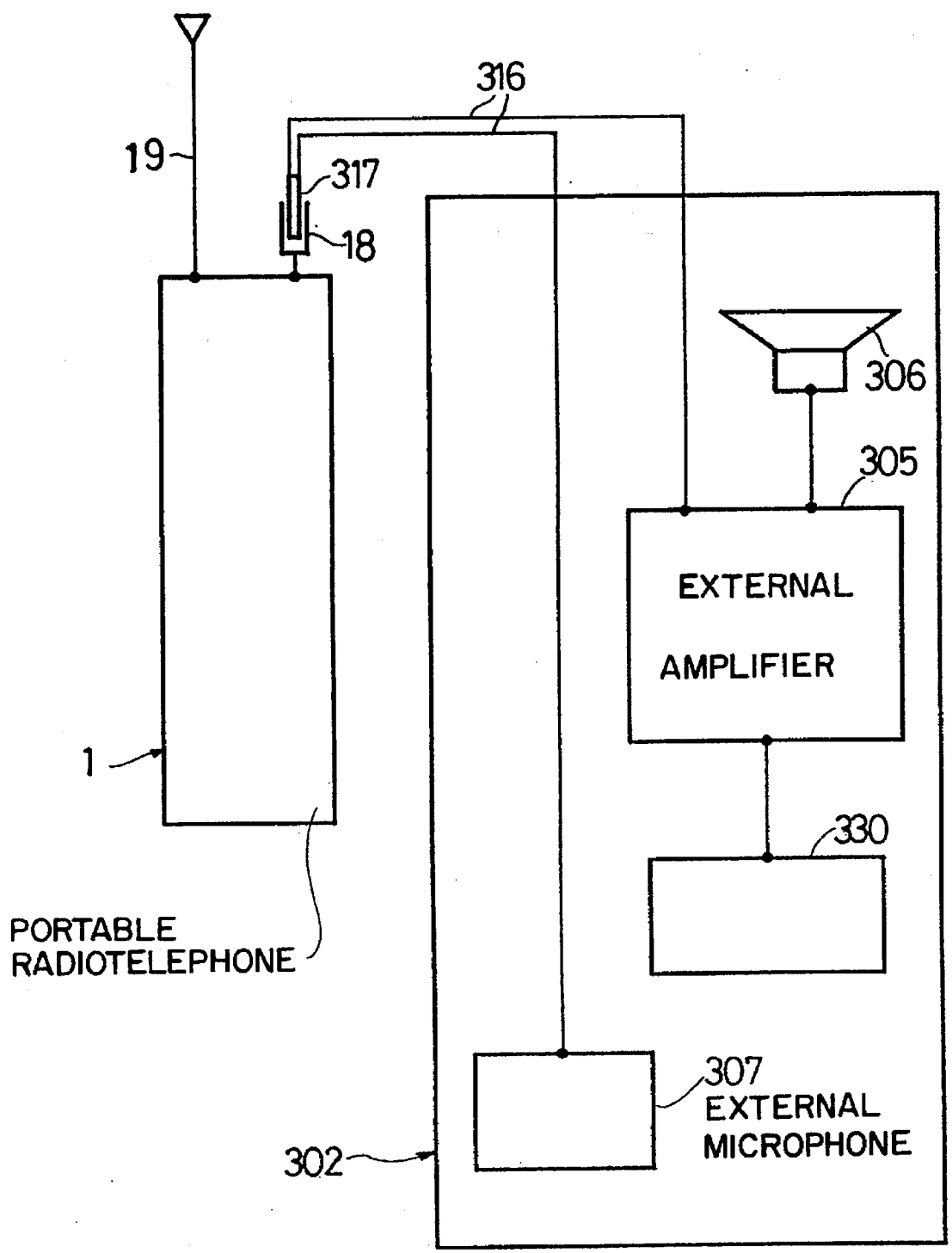
FIG. 12 is a block diagram of the third embodiment.

FIG. 12 is a roughly illustrated circuit diagram showing a connected state between the portable radiotelephone 1 and the holder 302. A hand free unit is installed in the holder 302 as similarly shown in FIG. 7, and hence the holder 302 is provided with the external amplifier 305, the external loudspeaker 306, the external microphone 307 and a battery 330 in a substantially similar manner as the second embodiment.

When carrying the portable radiotelephone 1 on the holder 302, the screw 360 has loosened and the second arm 352 is pivoted clockwise so as to open the space between the holding portion 354 and the holder 302 up to such an extent as corresponding to a thickness of the radiotelephone 302. Then, the screw 360 has fastened and the second arm 352 is kept in a fixed position. Next, the first arm 342 is pivoted clockwise thereby to insert the radiotelephone 1 into between the pusher portion 344 and the holder 302 until the bottom of the radiotelephone 1 reaches the stepped support 315. When the first arm 342 is released, the radiotelephone 1 is fixedly carried on the holder 302.

Figure 13:
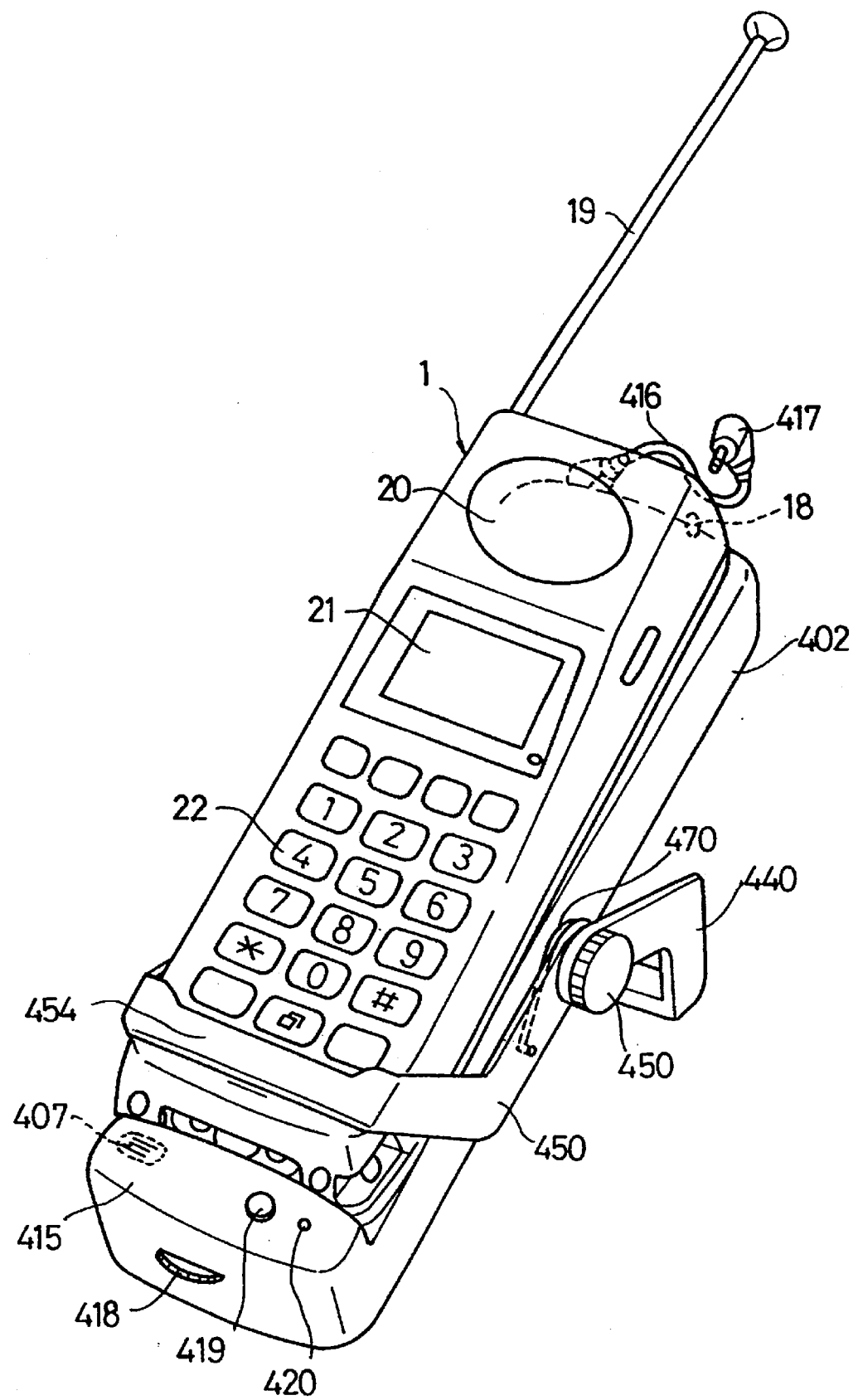
FIG. 13 is a perspective illustration of the fourth embodiment, showing a combined state between a holder and a portable radiotelephone.
Figure 14:
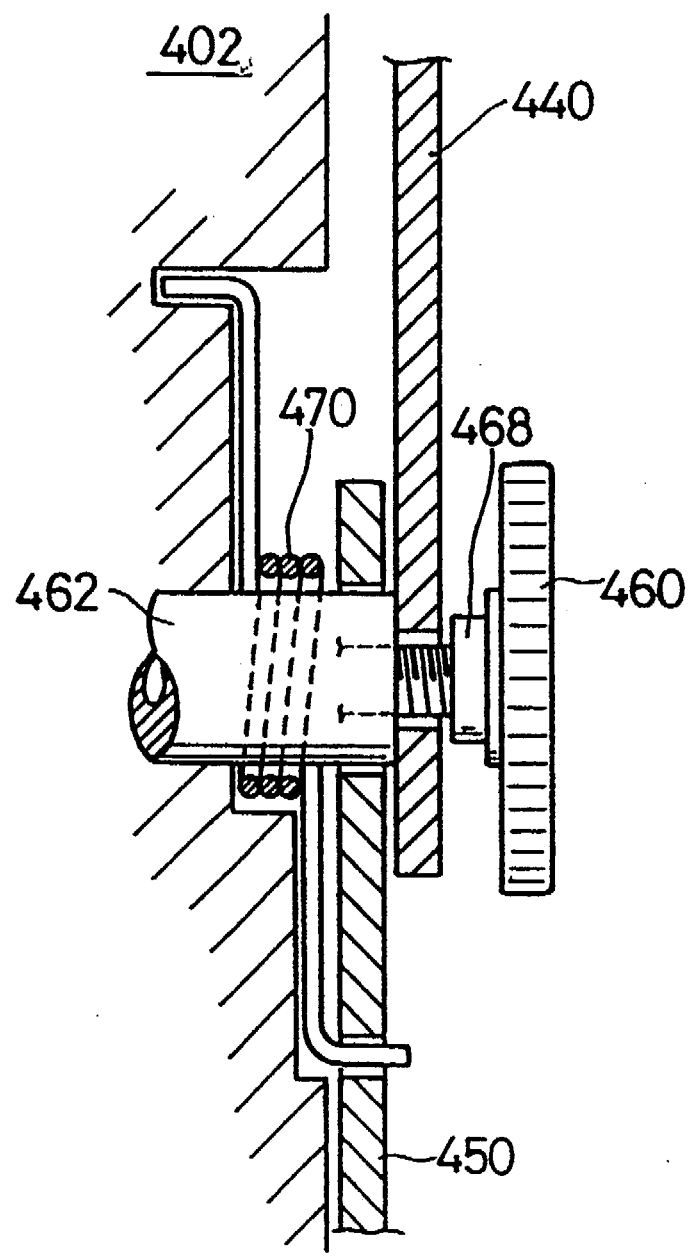
FIG. 14 is an enlarged cross section of an essential part.
Figure 15:
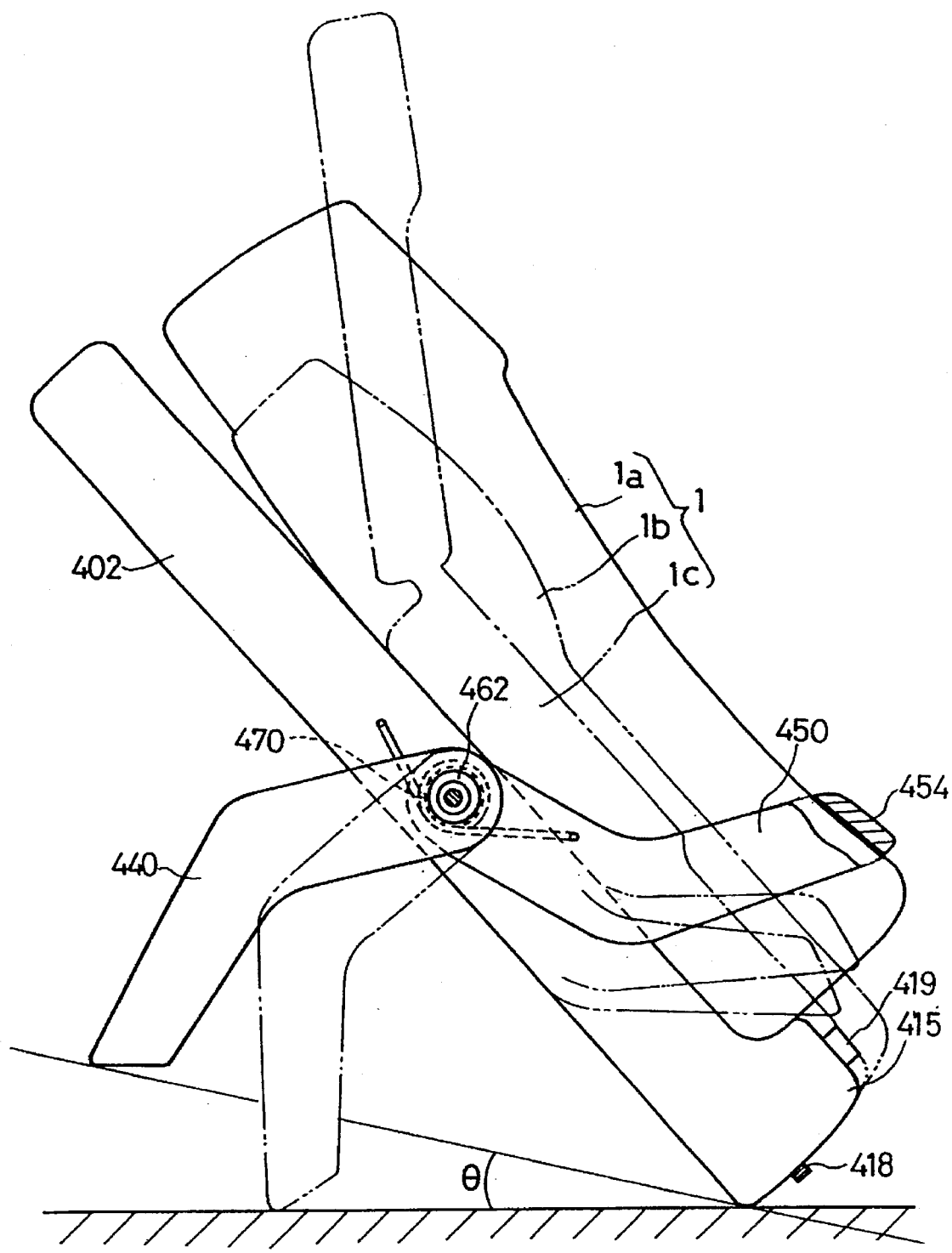
FIG. 15 is an operation explanatory view.

FIGS. 13 through 15 show the fourth embodiment of the present invention, wherein a first fixing member 340 as illustrated in FIG. 9, is modified with respect to the third embodiment but remainders are constituted in a substantially similar form thereto. As seen in FIG. 13, a portable radiotelephone 1 is carried on a holder 402 and biased under spring pressure to the holder 402 by a fixing member 450. The fixing member 450 is pivotally supported on a common axis with an adjustable stand 440 by a screw 460. The holder 402 is supported in an obliquely inclined state by the adjustable stand 440. A hand free unit is installed in the holder 402 and connected to an earphone microphone terminal 18 through a jack 417 provided at an end of a cord 416. On the lower portion of the holder 402 there is protruded a stepped support 415 in which an external microphone 407 is installed. A volume adjuster 418 is arranged at the lower end of the holder 402 in the vicinity of the external microphone 407. There are also provided on the lower portion of the holder 402 a main switch 419, for turning on and off an external amplifier, (not shown) and a power indicator 420. As shown in FIG. 14, the fixing member 450 is pivotally supported on a pivot shaft 462 and biased to the upper surface of the holder 402 by a coiled spring 470. The coiled spring 470 is pre-loaded and engaged at an end thereof with the fixing member 450 and at the other end thereof with the holder 402 in such a manner that the lower portion of the radiotelephone 1 is forced under the spring pressure of the coiled spring 470 to the holder 402 through a pusher portion 454 of the fixing member 450 to be fixed thereon. The pusher portion 454 is located in such a position as not to overlap an operation button 22 to ensure an easy access to the latter. The stand 440 is formed of generally U-shaped configuration and pivotally arranged at the back side of the holder 402. Each end of the stand 440 is pivoted on a pivot shaft 462 by a screw 460 which is fastened to a screw hole formed at an outer end of the pivot shaft 462. By screwing up the stand 440, the stand 440 is squeezed between a boss 468 of the screw 460 and the end of the pivot shaft 462 thereby being immovably maintained. If required, a pivotal angle of the stand 440 is easily adjustable by loosening and fastening the screw 460.

When explaining the operation in accordance with FIG. 15 which is a roughly sketched side view illustrating a mounting condition between radiotelephones 1a, 1b, 1c of different size and shape and the holder 402, the pusher portion 454 of the fixing member 450 is opened upwardly against a force of the coiled spring 470 so as to insert one of the radiotelephones 1a, 1b, 1c through the open space up to such a position that the bottom of the radiotelephone 1 is rested on the stepped support 415 of the holder 402. Upon releasing the pusher portion 454, the fixing member 450 is rotated under the spring force of the coiled spring 470 so as to hold the radiotelephone 1 between the pusher portion 454 and the holder 402. As will be understood from the foregoing, the holder 402 and the fixing member 450 is so designed and constructed that various types of the radiotelephones such as 1a, 1b, 1c, which are different in size and shape from each other may be held by adjusting the pivotal angle of the fixing member 450 with respect to the holder 402. As mentioned above, since the stand 440 is easily adjustable to vary its inclined angle for example to an angle 1 as seen in FIG. 15, it is possible to utilize the radiotelephone 1 at the optimum inclination according to circumstances.

Figure 16:
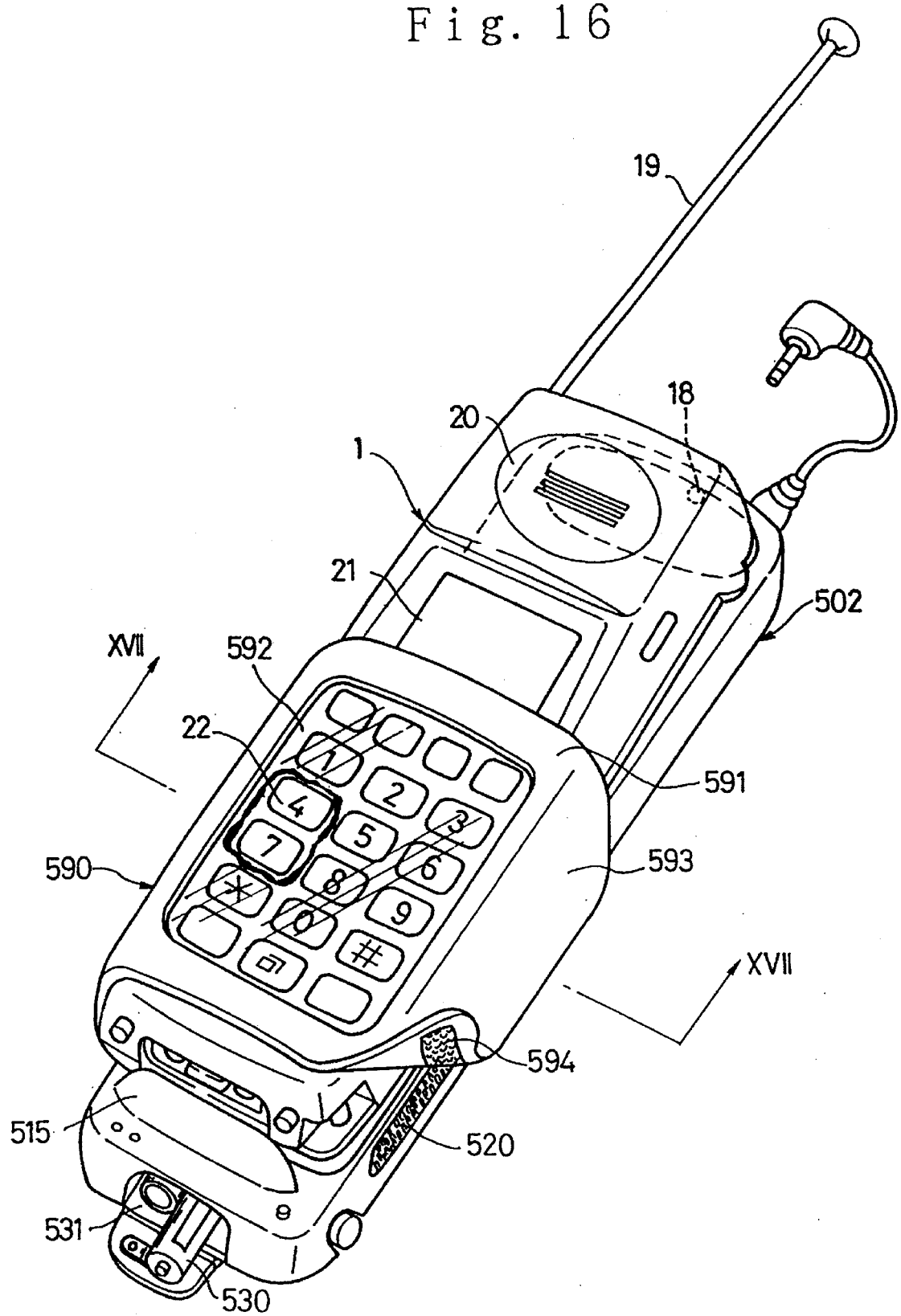
FIG. 16 is an exploded perspective view of the fifth embodiment.
Figure 17:
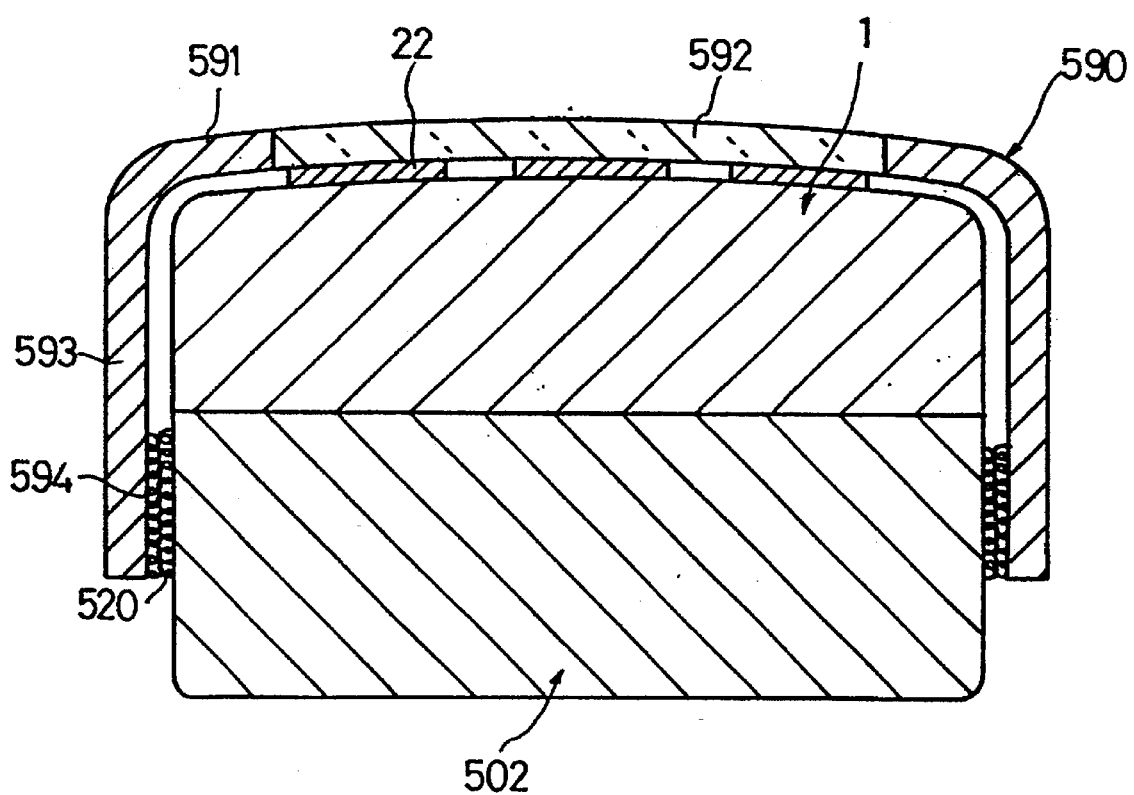
FIG. 17 is a cross section, taken along line XVII–XVII of FIG. 16.
Figure 18:
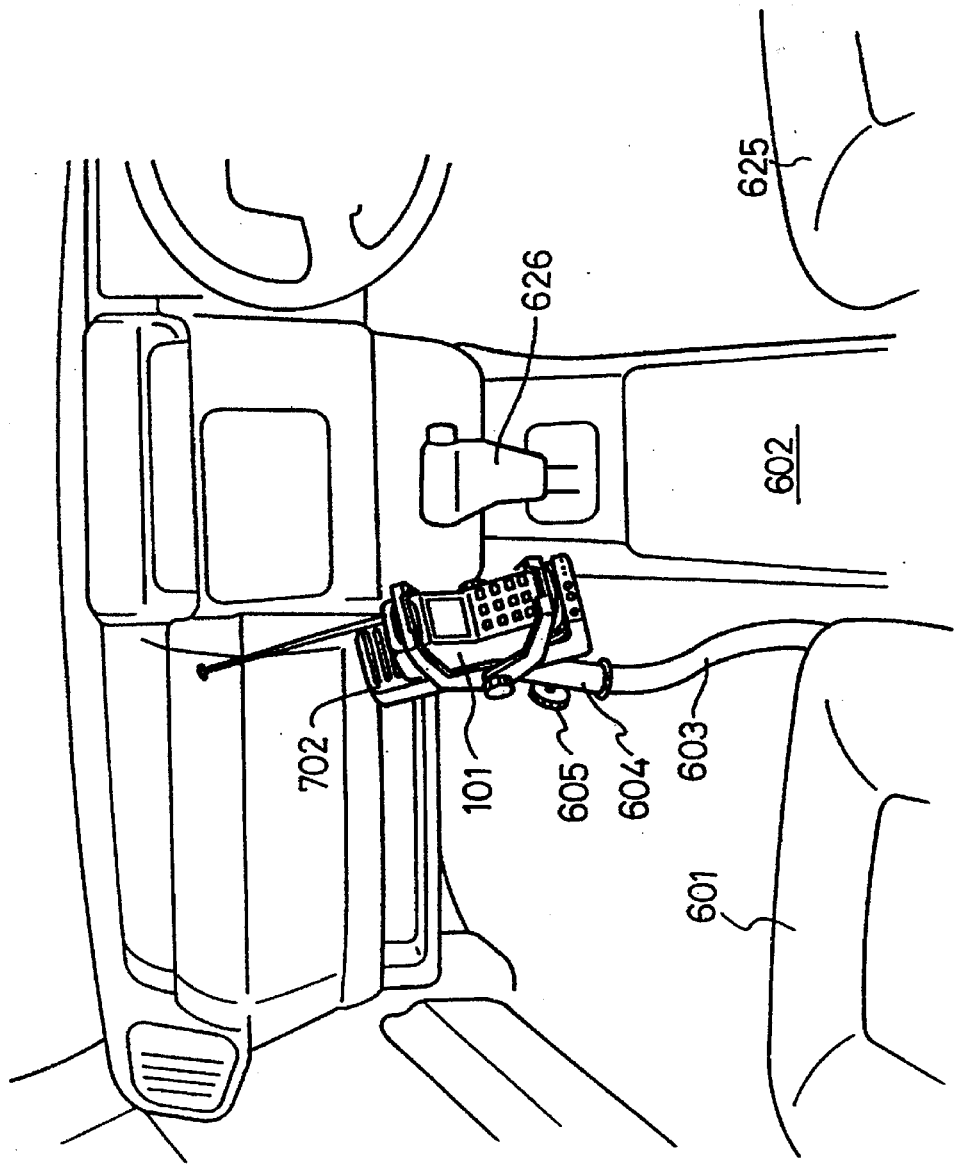
FIG. 18 is a schematic illustration of the sixth embodiment showing an arrangement of an apparatus within an automobile compartment, as viewed from a rear side thereof.
Figure 19:
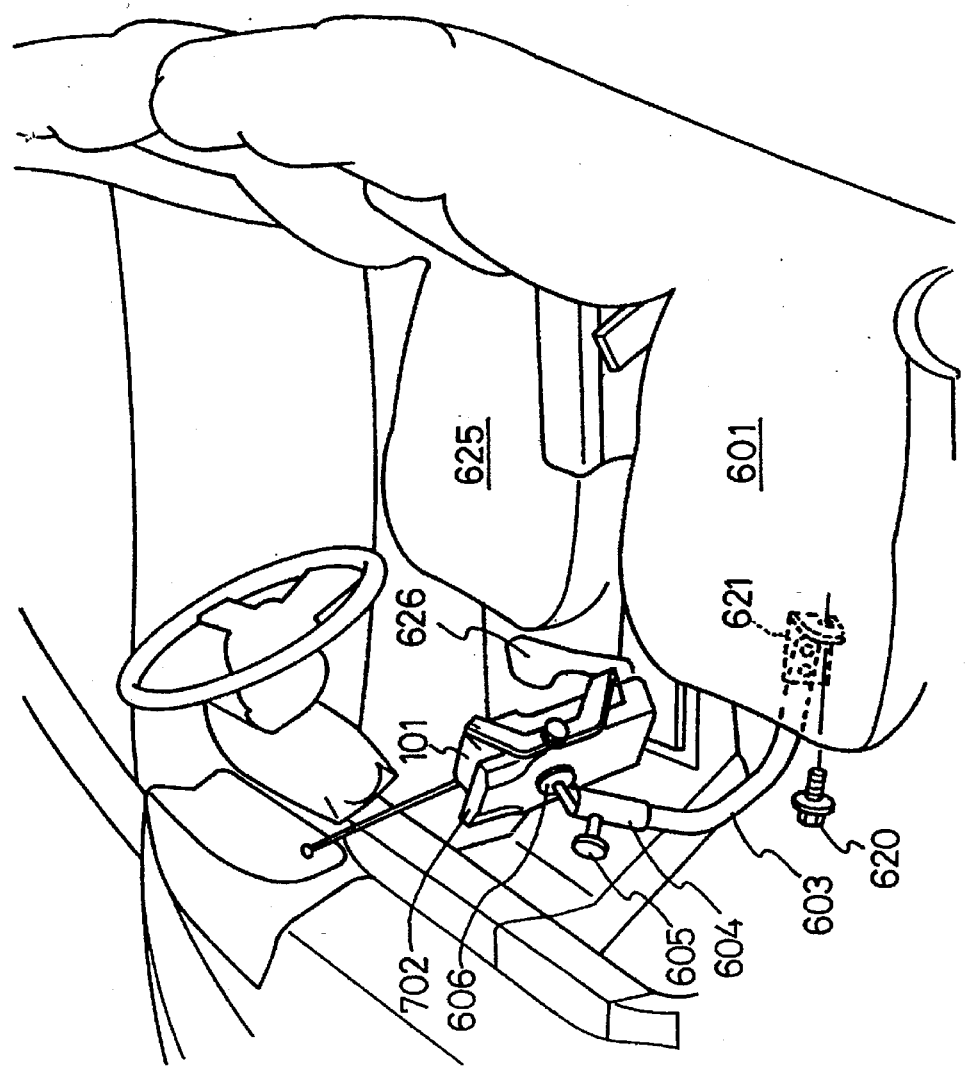
FIG. 19 is a side view of FIG. 18, as viewed from a side of a passenger seat.
Figure 20:
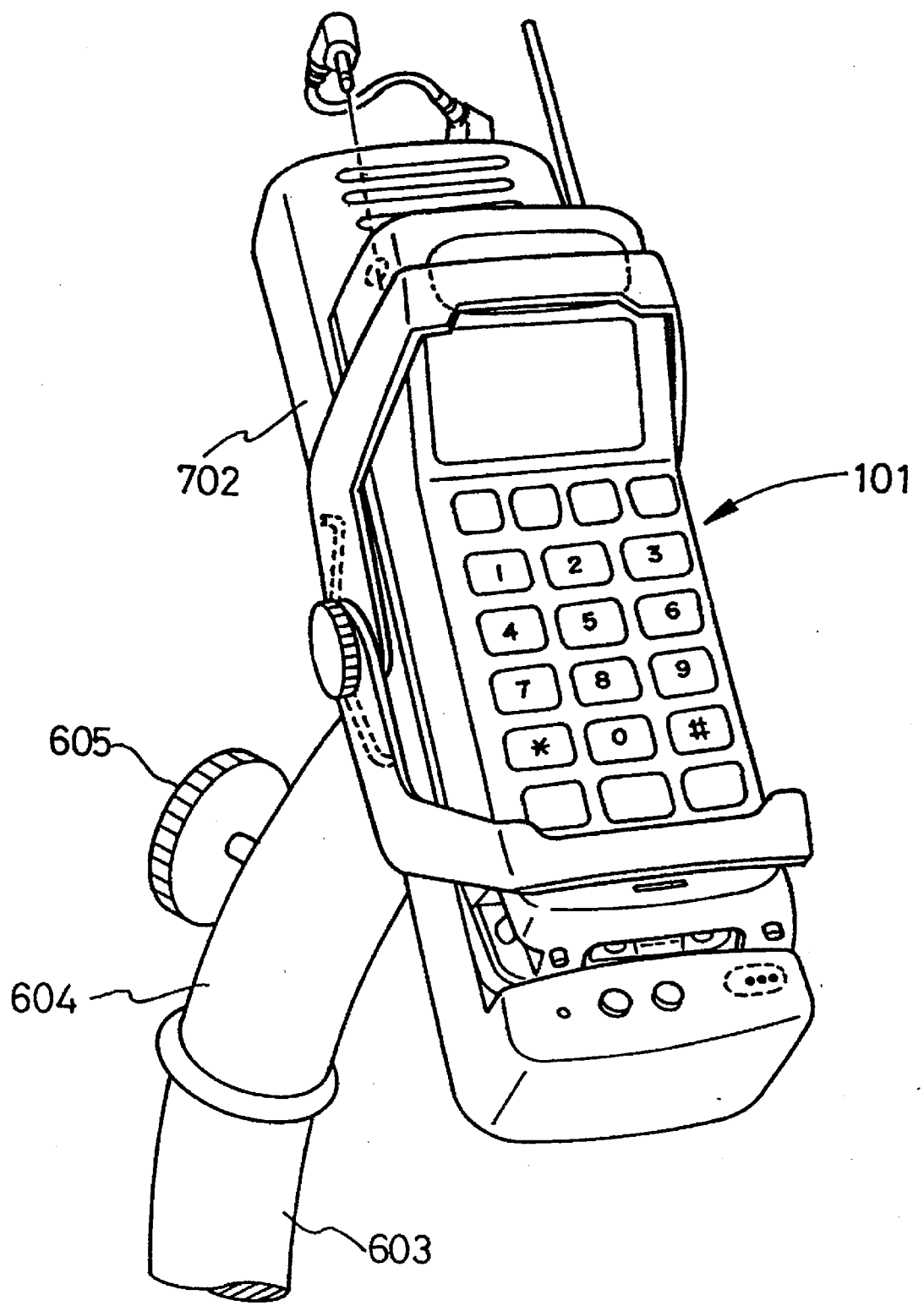
FIG. 20 is an enlarged perspective view of an essential part.

In FIGS. 16 and 17, a fixing member 590 is formed of a soft material such as cloth or leather of natural or synthetic resin and provided at the middle portion thereof with a window 592 of transparent resin for an operation button 22. A holder 502 is formed therein with a hand free unit and close to a lower projected portion 515 thereof with a housing 531 for accommodating a battery 530 for an amplifier. On each lateral side 593 of the fixing member 590 is provided a male fastener 594 to be fastened to a female fastener 520 which is arranged on each lateral side of the holder 502. The length and width of this fixing member 590 may be freely varied in accordance with sizes and shapes of the radiotelephones 1.

Figure 21:
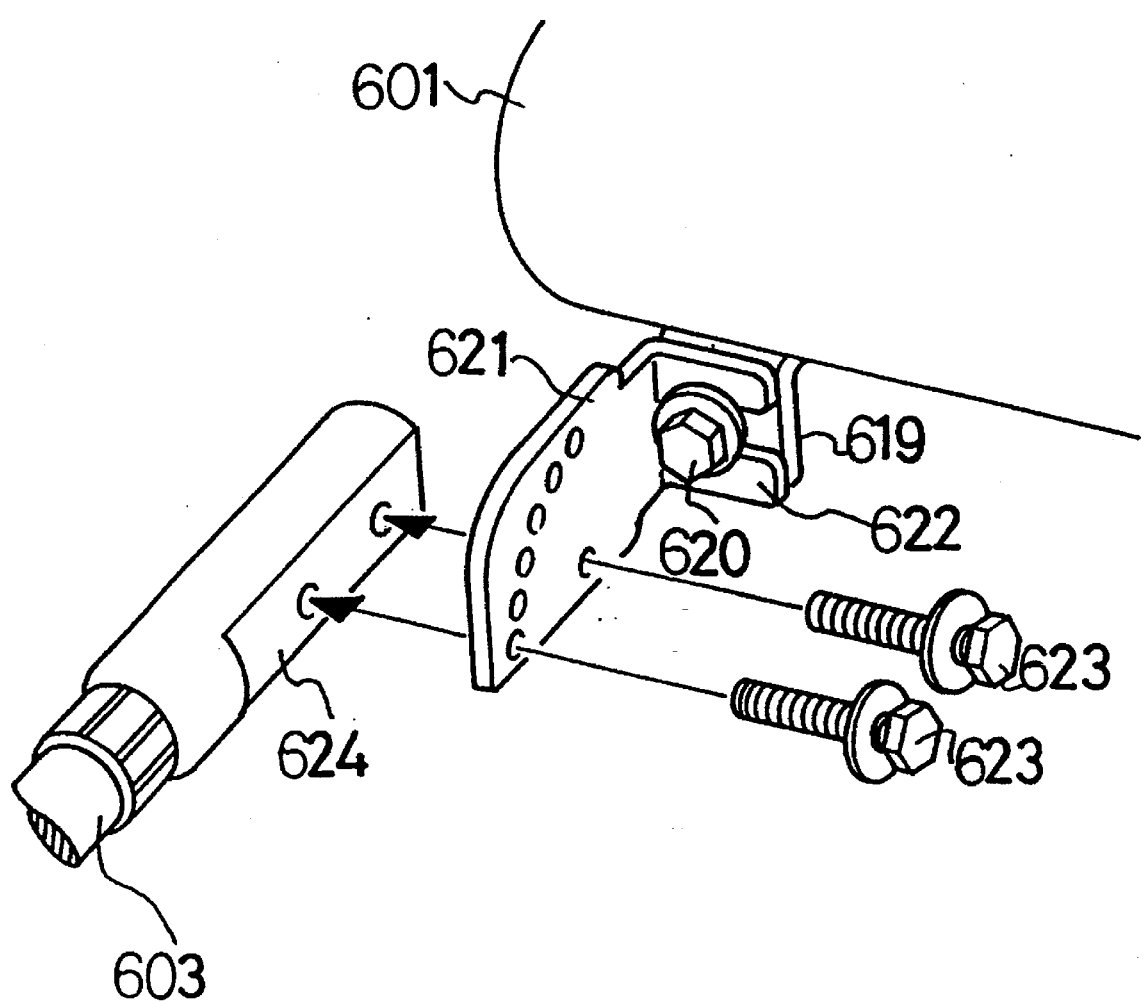
FIG. 21 is an explanatory view showing a mounting state of an essential part of the sixth embodiment.

FIGS. 18 through 21 show a supporting construction of a holder 702, wherein a stand 603 of flexible tube extends upwardly above the front end of a passenger seat 601 and adjacent to a console box 602. The holder 702 is connected through a ball joint 606 with a joint pipe 604 which is coupled rotatably adjustable with the upper end of the stand 603 by a bolt 605. The construction of a radiotelephone 101 and the holder 702 is substantially equal to that in the preceding embodiments. FIG. 21 illustrates a mounting construction of the lower end of the stand 603 in which reference numerals 610 through 624 designate in turn an end of a slide rail, a bolt, a generally L-shaped bracket, a leg portion of the bracket 622, a bolt and a lower mounting end of the stand 603, respectively. With this adjustable holder supporting construction, an operator may be easily accessible to the radiotelephone 101 within a driving compartment 625. Reference numeral 626 designates a shift lever.

Figure 22:
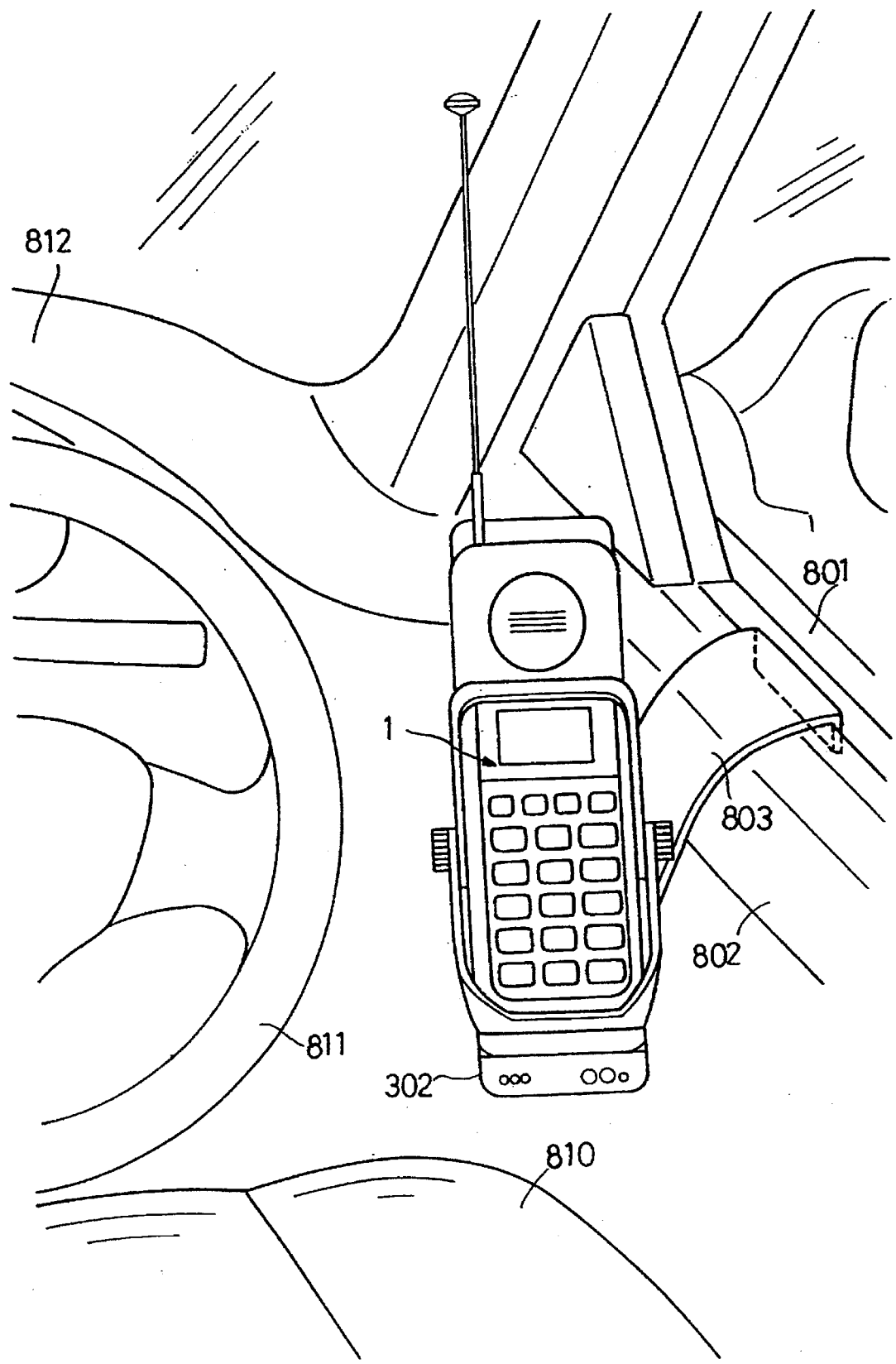
FIG. 22 is a schematic illustration of the seventh embodiment showing an arrangement of an essential part.
Figure 23:
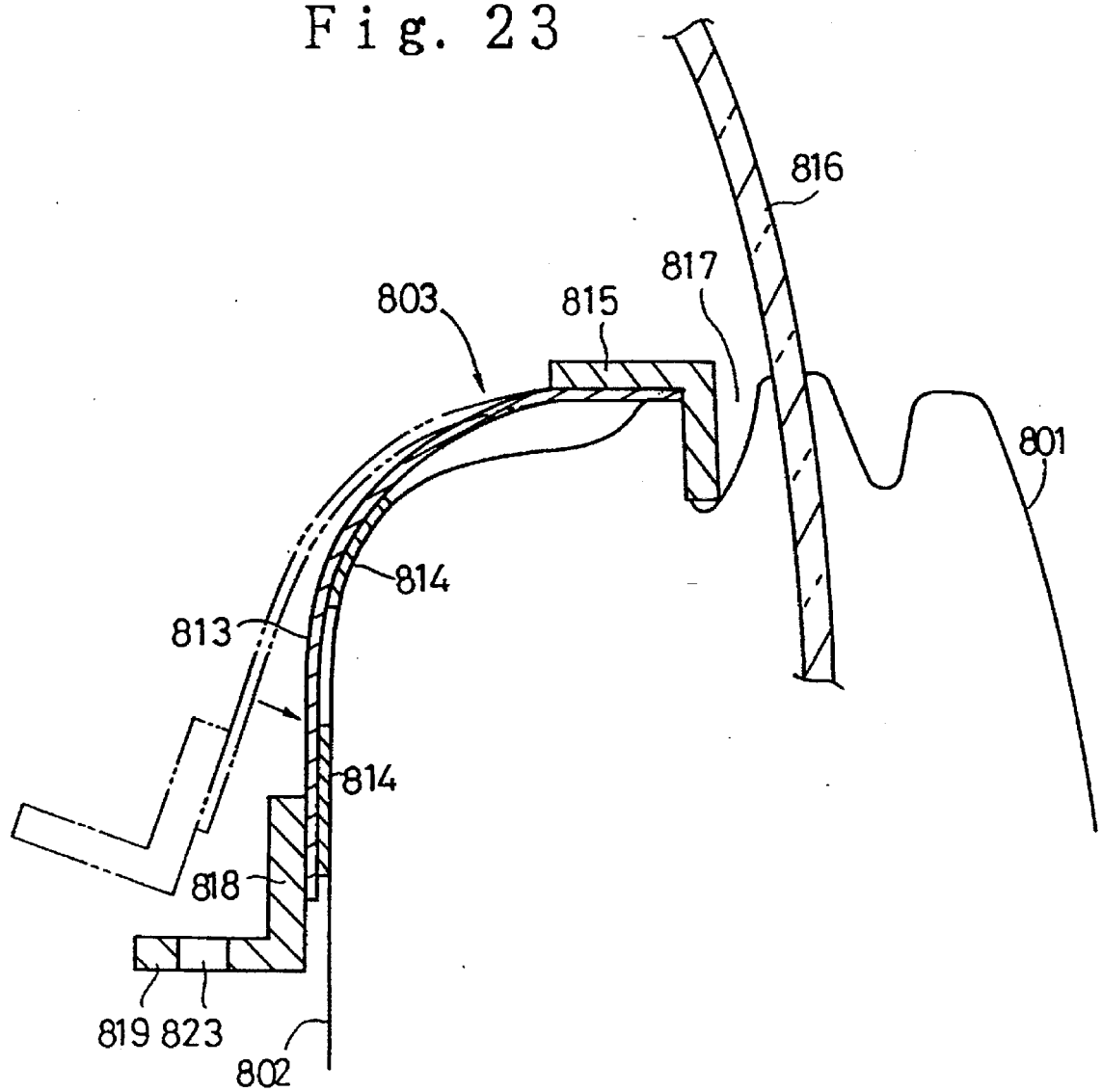
FIG. 23 is a roughly illustrated cross section for explaining a mounting state of a bracket.
Figure 24:
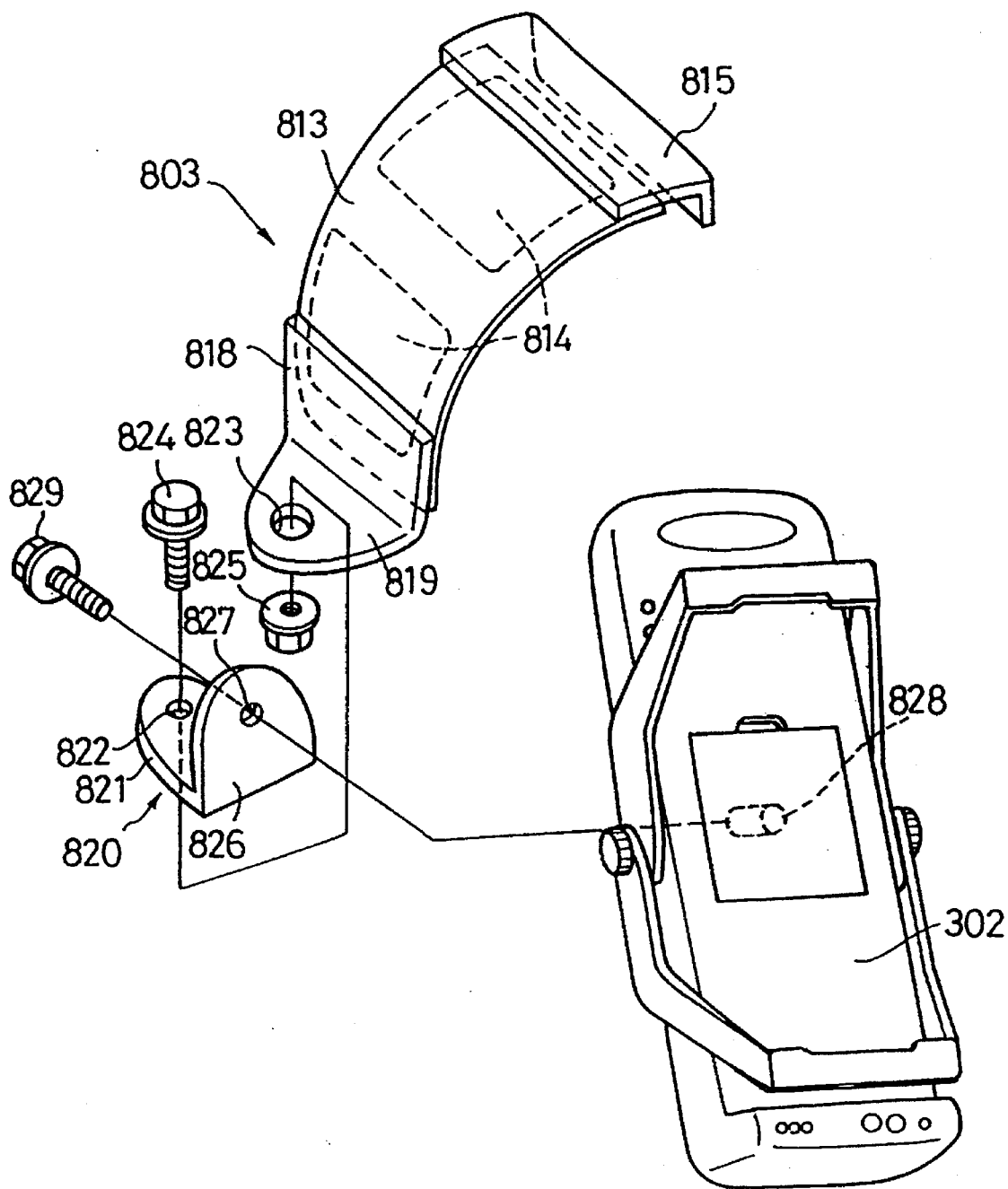
FIG. 24 is an exploded perspective view of an essential part of the seventh embodiment.
Figure 25:
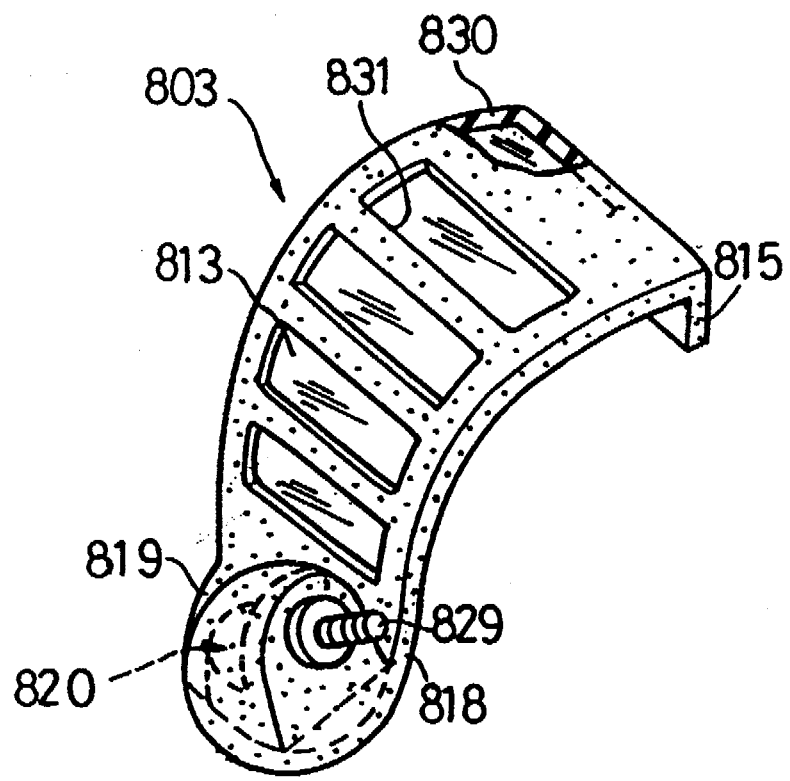
FIG. 25 is a partial cutout perspective view of a modified bracket.

In FIGS. 22 through 24, there is provided a bracket 803 on an operator side door 801 in such a way that the same is mounted at the upper end thereof on an upper portion of a door lining 802. A holder 302 carrying thereon a portable radiotelephone 1 is supported on a lower end of the bracket 803 and located at the lateral side of a steering handle 811 adjacent to a seat 810. Reference numeral 812 designates an instrument panel. As shown in FIGS. 23 and 24, the bracket 803 is formed with a flat flexible main plate 813 which extends along the door lining 802 whereby being secured to the lining 802 by a fixing means 814 such as a two-faced adhesive tape. On each of an upper and lower end of the main plate 813 there is integrally provided a substantially L-shaped hook 815 and an L-shaped mount 818 each made of a hard metal. The hook 815 is engaged with an upper edge of a door groove 817 for allowing an upward and downward movement of a window glass 816. The mount 818 is formed with a horizontally extending tongue 819 on which a through-bore 823 is provided. Reference numeral 820 designates an L-shaped bracket for mounting the holder 302 on the bracket 803. A horizontal portion 821 of the bracket 820 is put on the horizontal tongue 819 in such a manner that a through-bore 822 thereof is arranged in alignment with the through-bore 823 of the tongue 819. Thus, the horizontal portion 821 is fixedly secured to the horizontal tongue 819 by a bolt 824 and a nut 825. An upright portion 826 of the bracket 820 is formed with an inclined surface for resting thereon the holder 302 at the predetermined angle and a through-bore 827 for fixedly mounting the holder 302 by fastening a bolt 829 therethrough to a nut portion 828 of the holder 302. In FIG. 25, the bracket 803 is covered with a coating 830 of rubber or the like on which several slits 831 are provided for maintaining a flexibility of the bracket 803.

While there has been described what is at present considered to be the preferred embodiments of the invention, it will be understood that various changes and modifications may be made therein without departing from the scope of the appended claims.

What is claimed is:

1. A message communication apparatus for a vehicle to be utilized, after actuation, without the use of an operator's hands comprising:

a portable radiotelephone being integrally provided with an earphone, a microphone, a transmitter, a receiver and an earphone microphone jack;

a holder for receiving said portable radiotelephone therein and located within a driving compartment of the vehicle;

a flexible cord extending from said holder, said flexible cord having a plug located at a distal end thereof for engagement with said jack;

an external microphone and an external amplifier being connectable through said holder and said flexible cord to said earphone microphone jack of said portable radiotelephone;

an external speaker being connected to said external amplifier for amplifying a received audio signal of said receiver of said portable radiotelephone, said external speaker receiving the amplified audio signal for providing sound from said external speaker, said external microphone being connectable through said holder and said flexible cord to said earphone microphone jack of said portable radiotelephone so as to enter a transmitting voice into said transmitter of said portable radiotelephone without the use of an operator's hands; and fixing means provided on said holder for fixedly holding the outer periphery of said portable radiotelephone, said fixing means including a first U-shaped arm and a second U-shaped arm, each of said U-shaped arms having a pair of side arm members interconnected by a central cross arm member, first and second pivot members for pivotally mounting each of said side arm members of said first and second U-shaped arms, respectively, to opposed sides of said holder for pivotal movement about a common pivot axis such that said central cross arm member of each of said first and second U-shaped arms may engage a front surface of said portable radiotelephone located in said holder, and at least one spring for biassing said first U-shaped arm toward said front surface of said portable radiotelephone located in said holder.

2. The message communication apparatus as set forth in claim 1, wherein said holder is provided with a stand which is pivotally mounted on said holder to adjust the inclination of the holder.

3. The message communication apparatus as set forth in claim 1, wherein said holder is supported by a stand which extends upwardly in the vicinity of a front end of a passenger seat and mounted around a central portion of a driving compartment.

4. The message communication apparatus as set forth in claim 1, wherein said holder is supported on an end of a bracket which is detachably mounted at the other end thereof on the upper part of a door lining at a lateral side of a driving compartment.

5. The message communication apparatus as set forth in claim 1, wherein said external amplifier and said external speaker are disposed within said holder.

6. The message communication apparatus as set forth in claim 5, wherein said external microphone is disposed within said holder.

7. The message communication apparatus as set forth in claim 1, wherein said external microphone is disposed within said holder.

8. The message communication apparatus as set forth in claim 1, wherein said second U-shaped arm is pivotal such that said central cross arm member of said second U-shaped arm is locatable behind said holder to form a stand for said holder.

9. A message communication apparatus for a vehicle to be utilized, after actuation, without the use of an operator's hands comprising:

a portable radiotelephone being integrally provided with an earphone, a microphone, a transmitter, a receiver and an earphone microphone jack;

a holder for receiving said portable radiotelephone therein and located within a driving compartment of the vehicle;

a flexible cord extending from said holder, said flexible cord having a plug located at a distal end thereof for engagement with said jack;

an external microphone and an external amplifier being connectable through said holder and said flexible cord to said earphone microphone jack of said portable radiotelephone; and an external speaker being connected to said external amplifier for amplifying a received audio signal of said receiver of said portable radiotelephone, said external speaker receiving the amplified audio signal for providing sound from said external speaker, said external microphone being connectable through said holder and said flexible cord to said earphone microphone jack of said portable radiotelephone so as to enter a transmitting voice into said transmitter of said portable radiotelephone without the use of an operator's hands;

wherein a fixing member is provided on said holder to fixedly hold the outer periphery of said radiotelephone;

wherein said fixing member is formed of material for covering the outer periphery of said radiotelephone and fastened at each lateral end to said holder; and wherein said fixing member is formed with a transparent window for viewing said radiotelephone.

10. The message communication apparatus as set forth in claim 9, wherein said fixing member is U-shaped and includes a pair of side members interconnected by a central face member.

11. The message communication apparatus as set forth in claim 10, further comprising first and second fasteners for fastening said side members to opposed sides of said holder such that said central face member may engage a front surface of said portable radiotelephone located in said holder.

12. The message communication apparatus as set forth in claim 10, wherein said transparent window is formed in said central face member.

13. The message communication apparatus as set forth in claim 9, wherein said holder is supported by a stand which extends upwardly in the vicinity of a front end of a passenger seat and mounted around a central portion of said driving compartment.

14. The message communication apparatus as set forth in claim 9, wherein said holder is supported on an end of a bracket which is detachably mounted at the other end thereof to an upper part of a door lining at a lateral side of said driving compartment.

15. The message communication apparatus as set forth in claim 9, wherein said external amplifier and said external speaker are disposed within said holder.

16. The message communication apparatus as set forth in claim 15, wherein said external microphone is disposed within said holder.

17. The message communication apparatus as set forth in claim 9, wherein said external microphone is disposed within said holder.

* * * * *